(12) United States Patent
Chang et al.

(10) Patent No.: US 7,359,895 B2
(45) Date of Patent: Apr. 15, 2008

(54) SPIRAL STRING MATCHING METHOD

(75) Inventors: Shu-Hsin Chang, Tainan (TW);
Shing-Hung Lee, Kauhsiung County (TW); Kuo-Pao Fan, Hsinchu County (TW); Tzong-Jye Liu, Taichung (TW); Shyhtsun Felix Wu, Davis, CA (US)

(73) Assignee: Industrial Technology Research Institute, Hsinchu (TW)

( * ) Notice: Subject to any disclaimer, the term of this patent is extended or adjusted under 35 U.S.C. 154(b) by 527 days.

(21) Appl. No.: 10/990,510

(22) Filed: Nov. 18, 2004

(65) Prior Publication Data

US 2006/0106773 A1  May 18, 2006

(51) Int. Cl.
*G06F 17/30* (2006.01)

(52) U.S. Cl. .................. 707/3; 707/2; 707/4; 707/6

(58) Field of Classification Search ............ 707/6
See application file for complete search history.

(56) References Cited

U.S. PATENT DOCUMENTS

| | | | |
|---|---|---|---|
| 5,265,004 A | 11/1993 | Schultz et al. | |
| 5,440,336 A | 8/1995 | Buhro et al. | |
| 5,459,798 A | 10/1995 | Bailey et al. | |
| 5,664,092 A | 9/1997 | Waites | |
| 5,761,538 A | 6/1998 | Hull | |
| 5,781,772 A | 7/1998 | Wilkinson, III et al. | |
| 5,825,921 A | 10/1998 | Dulong | |
| 5,825,926 A | 10/1998 | Tanaka | |
| 5,873,081 A | 2/1999 | Harel | |
| 5,881,312 A | 3/1999 | Dulong | |
| 5,960,395 A | 9/1999 | Tzirkel-Hancock | |
| 5,963,942 A * | 10/1999 | Igata | 707/6 |
| 5,995,963 A * | 11/1999 | Nanba et al. | 707/6 |
| 5,995,971 A | 11/1999 | Douceur et al. | |
| 6,014,659 A | 1/2000 | Wilkinson, III et al. | |
| 6,041,053 A | 3/2000 | Douceur et al. | |

(Continued)

OTHER PUBLICATIONS

Coit et al., "Towards Faster String Matching for Intrusion Detection or Exceeding the Speed of Snort," IEEE Comp. Soc, Proceedings DARPA Information Survivability Conference and Exposition II. DISCEX'01, vol. 1, pp. 367-373, 2001.

(Continued)

*Primary Examiner*—Khanh B. Pham
*Assistant Examiner*—Andalib F Lodhi
(74) *Attorney, Agent, or Firm*—Finnegan, Henderson, Farabow, Garrett & Dunner LLP

(57) ABSTRACT

A string matching method is provided for searching a text received in a string matching system for any of a predetermined set of patterns, each of the text and the patterns including a string of characters or symbols. The method includes generating a number of pattern folds for each of the patterns and generating a number of text folds for the text, both the number of pattern folds for each of the patterns and the number of text folds being equal to a folding width, generating a set of pattern folds from the pattern folds of all the patterns, selecting one of the text folds, performing a first search on the selected text fold for matches of any pattern folds, and if a pattern fold is found, performing a second search to determine if the text contains a match of any of the predetermined set of pattern.

37 Claims, 15 Drawing Sheets

U.S. PATENT DOCUMENTS

| | | |
|---|---|---|
| 6,094,443 A | 7/2000 | Dwork |
| 6,108,666 A | 8/2000 | Floratos et al. |
| 6,122,757 A | 9/2000 | Kelley |
| 6,272,238 B1 | 8/2001 | Kugai |
| 6,295,524 B1 | 9/2001 | Yianilos et al. |
| 6,338,061 B1 | 1/2002 | Shimomura |
| 6,393,486 B1 | 5/2002 | Pelavin et al. |
| 6,556,984 B1 * | 4/2003 | Zien ................ 707/2 |

OTHER PUBLICATIONS

Aho et al., Efficient String Matching: An Aid to Bibliographic Search, Communications of the ACM, vol. 18, No. 6, pp. 333-340, Jun. 1975.

* cited by examiner $P_1$ = he  $P_2$ = hers
$P_3$ = his  $P_4$ = she

*Before Shift:*

*After Shift:*

$P_{1,1} = a\ c\ d$
$P_{1,2} = a\ b$
$P_{1,3} = b\ a$
$P_{2,1} = a\ b$
$P_{2,2} = b\ a$
$P_{2,3} = a\ b$
$P_{3,1} = c\ d\ a$
$P_{3,2} = a\ c\ d$
$P_{3,3} = a\ b$ $A = a\ b$
$B = a\ c\ d$
$C = b\ a$
$D = c\ d\ a$ $P_1 = B + A + C$
$P_2 = A + C + A$
$P_3 = D + B + A$

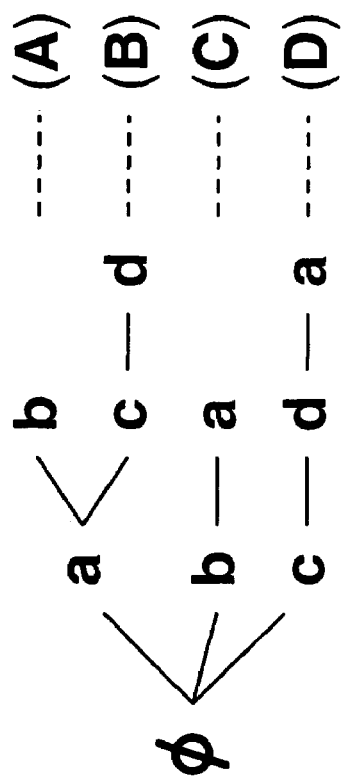
Fig. 8(a)
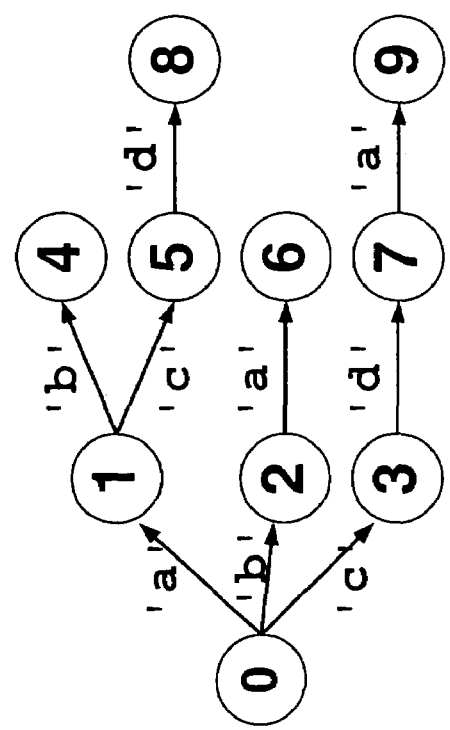
Fig. 8(b)
| This Node | Next Node |
|---|---|
| 0 | 0 |
| 1 | 0 |
| 2 | 0 |
| 3 | 0 |
| 4 | 2 |
| 5 | 3 |
| 6 | 1 |
| 7 | 0 |
| 8 | 7 |
| 9 | 1 |
Fig. 8(c)

SPIRAL STRING MATCHING METHOD

DESCRIPTION OF THE INVENTION

1. Field of the Invention

This invention is in general related to a string matching method and, more particularly, to a spiral string matching method that has an improved matching speed as compared to conventional methods.

2. Background of the Invention

String matching methods are widely used in systems such as intrusion detection systems, virus detection systems, and data mining systems. To detect an intrusion or a virus, a local system utilizes a matching method to search a received message for any of a predetermined set of strings, and treats the message accordingly based on the matching results. Each of the message and the predetermined set of strings may include a number of characters or symbols. The received message may be referred to as the text, the predetermined set of strings may be referred to as a patterns set, and each member of the patterns set may be referred to as a pattern. A match is said to occur if a pattern is identical to a substring of the text.

An example of conventional string matching methods is called the naive string matching method, which compares the text against the patterns one by one, and determines if any substring of the text matches any of the patterns. The naive string matching method is generally very time consuming. For example, if the patterns set includes k patterns, the length of each pattern is n, and the length of the text T is m, wherein k, m, and n are integers, the time taken to search the text for a pattern in the patterns set is of the order of kmn.

Another conventional string matching method called the Aho-Corasick Algorithm (AC Algorithm) improves the matching speed by simultaneously comparing the text with multiple patterns. The AC Algorithm is described in detail with reference to FIGS. 1-4.

To facilitate illustration, the term "tree" is hereinafter used to refer to a rooted and directed tree having a root node and a number of descendant nodes. Each of the descendant nodes has a parent node and is a child node of its parent node. Each node, including the root node, may have more than one child node. An edge connecting a parent node to a child node is called the leading edge of the child node. A level of a node is defined as the distance of that node from the root node measured in the number of edges. The root node may be considered as level 0 of the tree. A node of level 1 (or the first level) is a child node of the root node and is one edge away from the root node, a node of level 2 (or the second level) is a child node of a node of level 1 and is thus two edges away from the root node, etc. All the nodes of level 1 collectively constitute level 1 (or the first level) of the tree, all the nodes of level 2 collectively constitute level 2 (or the second level) of the tree, etc. A level having a higher level index is considered to be "deeper" than a level having a lower level index, while a level having a lower level index is considered to be "shallower" than a level having a higher level. Thus, level 2 is deeper than level 1, and level 1 is shallower than level 2.

According to the AC Algorithm, a patterns tree is generated to represent all the patterns in the patterns set. The generation of a patterns tree is described below with reference to FIGS. 1(*a*)-(*d*). The patterns set is assumed to include four patterns, "he", "hers", "his", and "she", denoted as $P_1$, $P_2$, $P_3$, $P_4$, respectively, as shown in FIG. 1(*a*), and the corresponding patterns tree is shown in FIG. 1(*b*).

The root node of the patterns tree is a null node. Each other node of the patterns tree is labeled by a character. The patterns tree is generated in such a way that each pattern in the patterns set is represented by one and only one corresponding node of the patterns tree, wherein a string composed of all the nodes from the root node to the corresponding node spells out that pattern.

One way to generate the patterns tree is to start with a first pattern, with the first character of the first pattern as a node of the first level, i.e., a child node of the null root node of the patterns tree, the second character of the first pattern as a second level node, etc. Other patterns in the patterns set are added to the patterns tree one by one. A new pattern to be added is first aligned with the patterns tree, with the first character thereof aligned with the first level of the patterns tree. Each character of the new pattern is then merged into the patterns tree. For the first character of the new pattern, there are two possible actions: 1) if the first character of the new pattern coincides with a node at the first level of the patterns tree, the first character is considered merged at that node; and 2) if the first character does not exist in the first level of the patterns tree, a new node labeled by the first character is added to the first level of the patterns tree, and the first character is merged at the new node. Each subsequent character of the new pattern is merged as a child node of the node at which the immediately preceding character was merged. Thus, for example, where the first character was merged at a parent node, if the second character of the new pattern coincides with a child node of the parent node, the second character is merged at that child node; if, however, the second character does not exist as a child node of the parent node, a new node is added as a child node of the parent node, and the second character is merged at the new node.

Following the above merger process, a patterns tree may be generated for the patterns set of FIG. 1(*a*). Starting with $P_1$, the patterns tree includes, in addition to the null root node labeled as Φ, a first level node labeled as "h" and a second level node labeled as "e". When $P_2$ is added to the patterns tree, the first character of $P_2$, i.e., "h", already exists in the first level and is merged at the corresponding first level node; the second character of $P_2$ again coincides with the child node "e" of the first level node labeled as "h", and, therefore, the second character of $P_2$ is merged at that child node "e". However, the third character of $P_2$, "r", does not exist as a child node of the node "e" at which the second character was merged, a new node labeled as "r" is added as a child node of that node "e". The process continues with the character "s" of $P_2$, and the characters of $P_3$, $P_4$, with the result shown in FIG. 1(*b*). Each pattern may be represented by one node of the patterns tree of FIG. 1(*b*). For example, $P_1$ is represented by node "e" at the second level of the patterns tree, and $P_3$ is represented by node "s" at the third level of the patterns tree.

Based on the patterns tree, a states tree is formed to indicate possible states of a matching machine implementing the AC matching method. The states tree includes a number of nodes connected together through edges. The root node of the states tree is labeled as "0" and represents an initial state of the matching machine. Each descendent node is labeled by an integer and represents a possible state of the matching machine, wherein the leading edge thereof is labeled to indicate a transition condition to that node from the parent node thereof. The transition between states, or nodes, will be described in detail later. Since a parent node may have more than one child node, the parent node may have more than one transition condition, as indicated by the edges leading to the child nodes thereof. For illustration purposes, a string of a node may be defined as the string composed of the labels of all edges to that node from the root node. Further, the terms "node" and "state" will be used interchangeably in the description of a states tree and the applications thereof.

The states tree may be formed as follows. First, a root node of the states tree, or the initial state, is labeled as state "0". Then, for each node of the patterns tree labeled by a character, a new node is added to the states tree with the leading edge thereof labeled by that character. The new nodes are added to the states tree in such a way that a parent node in the patterns tree corresponds to the leading edge of a parent node in the states tree, and a child node in the patterns tree corresponds to the leading edge of a child node in the states tree. A states tree thus formed for the patterns tree of FIG. 1(b) is shown in FIG. 1(c), wherein the nodes of the states tree are labeled by consecutive numbers 0, 1, 2, . . . , 9, each representing a possible state of the matching machine, and the edges are labeled by characters corresponding to respective nodes of the patterns tree.

During the matching process, the edges of the states tree indicate transition conditions for the matching machine. For example, as shown in FIG. 1(c), when the matching machine is at state 3 and the next character in the text is "r", the matching machine would transit to state 6; when the current state is state 5 and the next character is "e", then the next state would be state 8. If a parent node has more than one child node, the matching machine may transit from the parent node to any of its child nodes, depending on which transition condition occurs.

On the other hand, according to the AC Algorithm, if all the transition conditions leading to the child nodes of the current node fail, the matching machine jumps to a "failure" node of the current node, which is defined as a node of the states tree whose string is the longest possible suffix of the string of the current node. If there is no node of the states tree whose string is a suffix of the string of the current node, the matching machine would jump back to the root node, or, in other words, the failure node of the current node would be the root node.

Accordingly, a transition table may be generated to list state transitions depending upon the occurrence or failure of transition conditions. FIG. 1(d) shows the transition table of the states tree of FIG. 1(c). The transition table has three columns. A first column lists all possible current states of the matching machine. A second column is divided into two sub-columns, a first sub-column listing the next state of the matching machine if a transition condition occurs (success), and a second sub-column listing the failure nodes when all transition conditions fail. A third column of the transition table lists a matching patterns set for each node, wherein the matching patterns set includes all possible matches of patterns when the matching machine is at the corresponding state. Thus, for example, as shown in FIG. 1(d), if the current state is state 1, the next state could be either state 3, if the next character in the text is "e"; or state 4, if the next character in the text is "i"; or state 0, if the next character in the text is neither "e" nor "i". Consider state 5 as another example: if the next character in the text is "e", the next state would be state 8; however, if the next character in the text is not "e", the next state would be state 1, because the longest possible suffix of the string of state 5 that corresponds to a node of the states tree is "h", and the corresponding node is node 1, or state 1. When the matching machine transits to state 8, a match occurs, and the matching pattern is "she", or $P_4$. Also, because the matching machine would transit to state 3 from state 8 upon receiving additional characters, and state 3 corresponds to "he", or $P_1$, the matching patterns set of state 8 would then include both $P_1$ and $P_4$, meaning if the matching machine is at state 8, at least two matches, $P_1$ and $P_4$, have occurred.

FIGS. 2(a)-2(d) illustrate the matching process of a matching machine applying the AC Algorithm using the states tree and the transition table of FIGS. 1(c) and 1(d). The text is assumed to be "ushers". The matching process examines one character at a time, and thus takes six steps to examine the text "ushers", numbered (1) through (6), respectively, as shown in FIG. 2(a). FIG. 2(a) also shows the state transitions at each of steps (1) to (6), as indicated by the arrows labeled by (1) to (6), respectively. FIGS. 2(b)-2(d) show detailed comparison between the patterns tree and the text at each of steps (1) to (6). The matching process starts from the initial state, state "0", of the states tree. As shown in FIGS. 2(a)-(d), at step (1), character "u" is considered. Since there is no transition condition of the root node of the states tree that matches character "u", the matching machine loops back to the root node, or the initial state, as indicated by the arrow pointing from and to the root node. At step (2), character "s" is considered, and because the leading edge of node 2 is "s", the matching machine transits to node 2. Subsequently, the matching machine transits to states 5 and 8 because of the occurrences of transition conditions of "h" and "e", respectively. As discussed above, when the matching machine transits to state 8, at least two matches, $P_1$ and $P_4$, have occurred. Then, the matching machine jumps to state 3 because state 8 has no child nodes. The next character in the text is "r", and the matching machine transits to state 6. Finally, at step (6), character "s" is considered and the matching machine transits to state 9, indicating a third match of $P_2$.

The AC Algorithm described above has two advantages over the naive string matching method: 1) if the prefixes of two or more patterns are the same as each other, the AC matching process only needs to consider the prefix once; 2) the AC matching process eliminates the need to compare the received text with patterns having prefixes identical to suffixes of those patterns already compared. Thus, the time to perform an AC matching process no more than 2m, where m is the length of the text. Clearly, the time to perform an AC matching process is not dependent on the length of each pattern or the number of patterns in the patters set.

To further improve the string matching speed, there has been proposed a so-called AC_BM Algorithm. According to the AC_BM Algorithm, a patterns tree is generated in the same way as described above in the description of the AC Algorithm. However, the AC_BM matching process starts by aligning the patterns tree with the text such that the shortest pattern in the patterns tree is aligned to the end of the text. For example, if the shortest pattern includes four characters, the first level of the patterns tree would be aligned with the fourth character from the right of the text. Then, the AC_BM Algorithm searches the part of the text with which the patterns tree is aligned for any pattern in a direction from shallower levels to deeper levels of the patterns tree. If there is no match, the patterns tree shifts to the left of the text and the above step is repeated. The patterns tree shifts to the left according to a bad character rule and a good prefix rule. According to the bad character rule, if a mismatch occurs at a character of the text, the patterns tree is shifted to the left by a minimal amount such that the character of the text is aligned with an occurrence thereof in the patterns tree. If the character of the text does not exist in any pattern, the patterns tree is shifted by a length of the shortest pattern. According to the good prefix rule, if a prefix of a substring (current substring) to which the patterns tree is currently aligned matches a prefix of a pattern in the patterns tree but the character next to the prefix in the text does not match the next character of the pattern, the patterns tree is shifted to the left by an amount such that the next occurrence of the prefix in the patterns tree is aligned to the prefix in the text, or, if there is no other occurrence of the prefix in the patterns tree, by a minimal amount such that a shorter prefix of the current substring is aligned to and matches a suffix of a pattern in the tree. To avoid possible matches being skipped, the shift of the patterns tree under the bad character rule and the good prefix rule should not be more than the length of the shortest pattern in the patterns tree.

FIGS. 3(a) and 3(b) illustrate the bad character rule of the AC_BM Algorithm. In FIGS. 3(a) and 3(b), the patterns set is assumed to include a number of strings: "tired", "tiring", "time", "tinted", and "tinsel", and the text is assumed to be "timeonmyside". The length of the shortest pattern, "time", is 4. Thus, in FIG. 3(a), the patterns tree is first aligned to the end of the text such that the first level of the patterns tree is aligned to "s" in the text. But because "s" does not match "t", the patterns tree is shifted to the left so that "s" in the text would be aligned with an occurrence of "s" in the patterns tree, and the result in shown in FIG. 3(b).

FIGS. 4(a) and 4(b) illustrate the good prefix rule of the AC_BM Algorithm. In FIGS. 4(a) and 4(b), the patterns set is assumed to include strings "tired", "tiring", "time", "tornado", and "tomto", and the text is assumed to be "automtone". The length of the shortest pattern, "time", is 4. Thus, as shown in FIG. 4(a), the patterns tree is first aligned to the end of the text such that the first level of the patterns tree is aligned to the fourth character from the right in the text. The matching process then compares the part of the text aligned with the patterns tree, "tone", with the patterns tree. The first two letters of the suffix, "to", match the first two characters in the pattern "tomto" in the patterns tree. However, the third character, "n", is a mismatch. According to the good prefix rule, the matching process would look for the next occurrence of "to" in the patterns tree and shift the patterns tree to the left such that the occurrence of "to" in the patterns tree would be aligned with the substring "to" in the text. The result in shown in FIG. 4(b). The shift amount is 3, less than 4, the length of the shortest pattern in the patterns tree.

SUMMARY OF THE INVENTION

The present invention provides for a string matching algorithm having a further improved string matching speed as compared to the conventional string matching methods.

Consistent with the present invention, there is provided a string matching method for use in a string matching system, wherein the string matching system receives a text and searches the text for any of a predetermined set of patterns, each of the text and the patterns including a string of characters or symbols. The method includes generating a number of pattern folds for each of the patterns, the number of pattern folds for each of the patterns being equal to a folding width; generating a set of pattern folds from the pattern folds of all the patterns; generating a number of text folds for the text, the number of text folds being also equal to the folding width; selecting one of the text folds; performing a first search on the selected text fold for matches of any pattern folds in the set of pattern folds; and if a pattern fold is found in the selected text fold, performing a second search to determine if the text contains a match of any of the predetermined set of patterns.

Consistent with the present invention, there is also provided a string matching method for use in a string matching system, wherein the string matching system receives a text and searches the text for any of a predetermined set of patterns, each of the text and the patterns including a string of characters or symbols. The method includes generating a number of pattern folds for each of the patterns, the number of pattern folds for each of the patterns being equal to a folding width, wherein the folding width is an integer number ranging from greater than 1 to a length of a shortest pattern in the set of patterns; generating a set of pattern folds including all distinct pattern folds; conceptually arranging the text into a spiral running clockwise downward from top when viewed from above, wherein a number of characters in each turn of the spiral is equal to the folding width, the characters of the text are aligned along a number of vertical lines, and all of the characters along each vertical line constitute a text fold; performing a vertical search along a selected one of the vertical lines of the text spiral for matches of pattern folds; and performing a latitudinal search in a latitudinal direction along the text spiral.

Consistent with the present invention, there is provided a string matching method for use in a string matching system, wherein the string matching system receives a text and searches the text for any of a predetermined set of patterns, each of the text and the patterns including a string of characters or symbols. The method includes determining a folding width w, wherein w is an integer; generating w text folds for the text, each text fold including all characters of the text spaced equally apart from one another by w characters; generating w pattern folds for each of the patterns, each pattern fold including all characters of the respective pattern spaced equally apart from one another by w characters; selecting a first string matching algorithm and a second string matching algorithm; performing data preparation according to the first and second string matching algorithms; selecting a text fold according to the second string matching algorithm; and searching the text for matches of any pattern in the patterns set. Wherein searching the text for matches of any pattern in the patterns set further includes performing a first search according to the first string matching algorithm along the selected text fold for matches of any pattern folds in the set of pattern folds, if a pattern fold is found in the selected text fold, interrupting the first search and performing a second search according to the second string matching algorithm to determine if the text contains a match of any of the predetermined set of patterns, selecting a text fold which is aligned to a pattern fold to be compared next according to the second string matching algorithm, and resuming the first search and repeating the above steps until the first search reaches the end of the selected text fold.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the features, advantages, and principles of the invention.

In the drawings,

FIGS. 8(a)-8(c) illustrate the generation of a folds tree, a states tree, and a transition table consistent with an embodiment of the present invention;

DESCRIPTION OF THE EMBODIMENTS

Figures 1A, 1B, 1C, 1D:
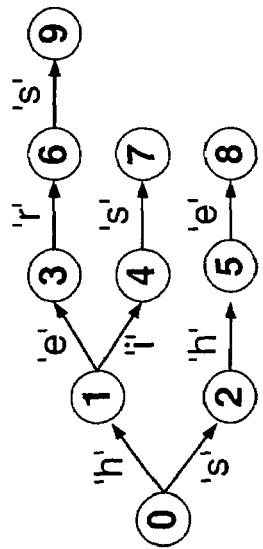
FIGS. 1(a)-(d) illustrate the generation of a patterns tree, a states tree, and a transition table according to the AC Algorithm.
Figure 2C:
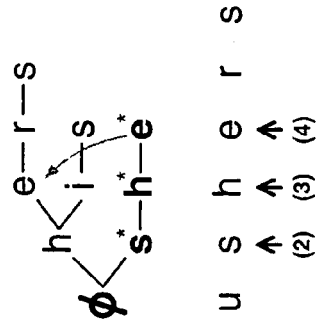
FIGS. 2(a)-2(d) illustrate the string matching process according to the AC Algorithm.
Figure 2D:
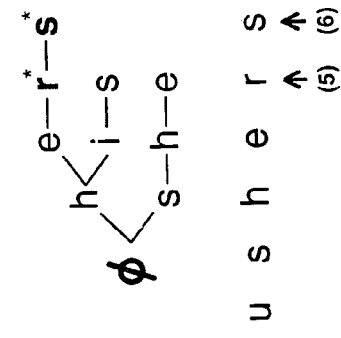
Figure 2A:
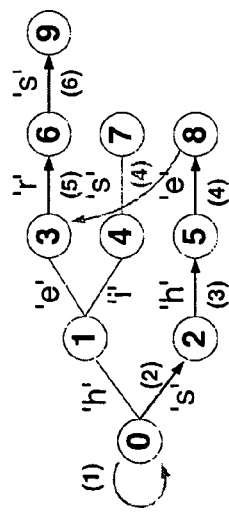
Figure 2B:
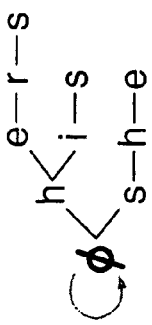
Figure 3A:
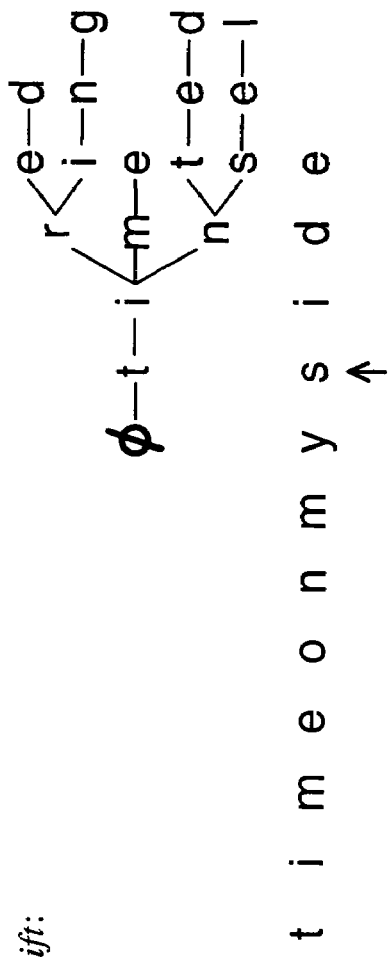
FIGS. 3(a)-3(b) illustrate the bad character rule according to the AC_BM Algorithm.
Figure 3B:
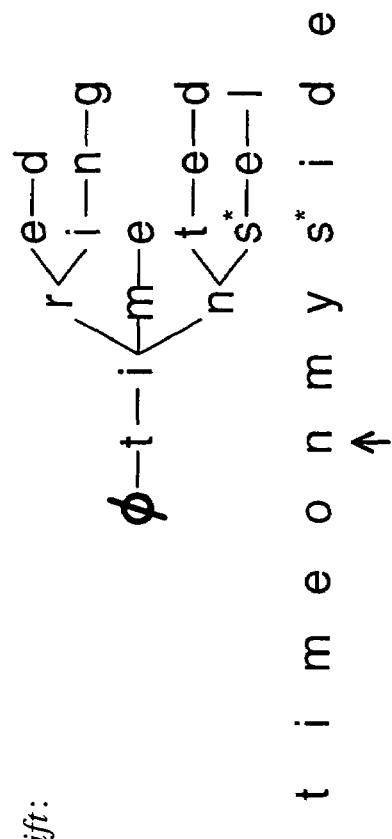

Reference will now be made in detail to embodiments of the invention, examples of which are illustrated in the accompanying drawings. Wherever possible, the same reference numbers will be used throughout the drawings to refer to the same or like parts.

Embodiments consistent with the present invention provide for a novel string matching method referred to herein as a spiral string matching method, or a spiral method, which has a faster string matching speed than that of traditional string matching methods. The spiral method consistent with the present invention may be implemented in software to be carried out in a general purpose computer device such as an IC (integrated circuit) processor. The processor receives a message (the text) and searches the text for a pattern in a predetermined patterns set. Each of the text and the patterns is a string of characters or symbols. A match is said to occur if a pattern is identical to a substring of the text and the substring may be called the match of the pattern. In the examples used in the following description, the text and the patterns only consist of letters. However, it is to be understood that the text and the patterns may also include substantially any types of characters or symbols other than letters.

Instead of comparing a pattern against a received text string on a basis of characters as the conventional methods, the spiral method performs string matching on a basis of so-called "folds". A fold of a string is defined as a sequence of all characters of the string spaced equally apart from one another by w characters, wherein w is an integer called the folding width. Thus, a string may be divided into w pattern folds. For example, if w=3, a string is divided into 3 folds: a first fold including the $1^{st}$, $4^{th}$, $7^{th}$, . . . , characters thereof, a second fold including the $2^{nd}$, $5^{th}$, $8^{th}$, . . . , characters thereof, and a third fold including the $3^{rd}$, $6^{th}$, $9^{th}$, . . . , characters thereof. Prior to the string matching process, a received text and each pattern in the patterns set are divided into w "text folds" and w "pattern folds", respectively. In the following description, each text fold is denoted as $T_i$, wherein i is the index of the respective text fold. For a match of a pattern to exist in the text, each pattern fold of the pattern must be found in a respective text fold of the text and the matches of the pattern folds must appear in the text in the same manner as the pattern folds appear in the pattern. Therefore, the spiral method searches one selected text fold for matches of the pattern folds of a pattern. If the selected text fold does not contain a match of any pattern fold of any pattern in the patterns set, it may be concluded that the text does not contain a match of any pattern and it would be unnecessary to perform searches of the rest of the text folds against the pattern folds. Only when a pattern fold is found in the selected text fold would the spiral method of the present invention continue to search the text folds other than the selected one. Therefore, the speed of the matching process of the spiral method based on folds is statistically faster than the matching process of conventional methods based on characters.

The matching process of the spiral method is described in further detail below. In the following description, the folding width is assumed to be 3 and, therefore, the text is divided into 3 text folds and each pattern is divided into 3 pattern folds. A text fold of a text T is denoted as $T_i$, wherein i is the index of the respective text fold and is an integer. A pattern fold of a pattern $P_i$ in the patterns set may be denoted as $P_{i,j}$, wherein i and j are integers, and i is the index of the respective pattern and j is the index of the respective pattern fold. It is to be understood that the folding width may be any integer number and is not limited to 3. The effect of the folding width on the matching process of the spiral string matching method and how to choose an effective folding width are discussed in further detail later.

Figure 5:
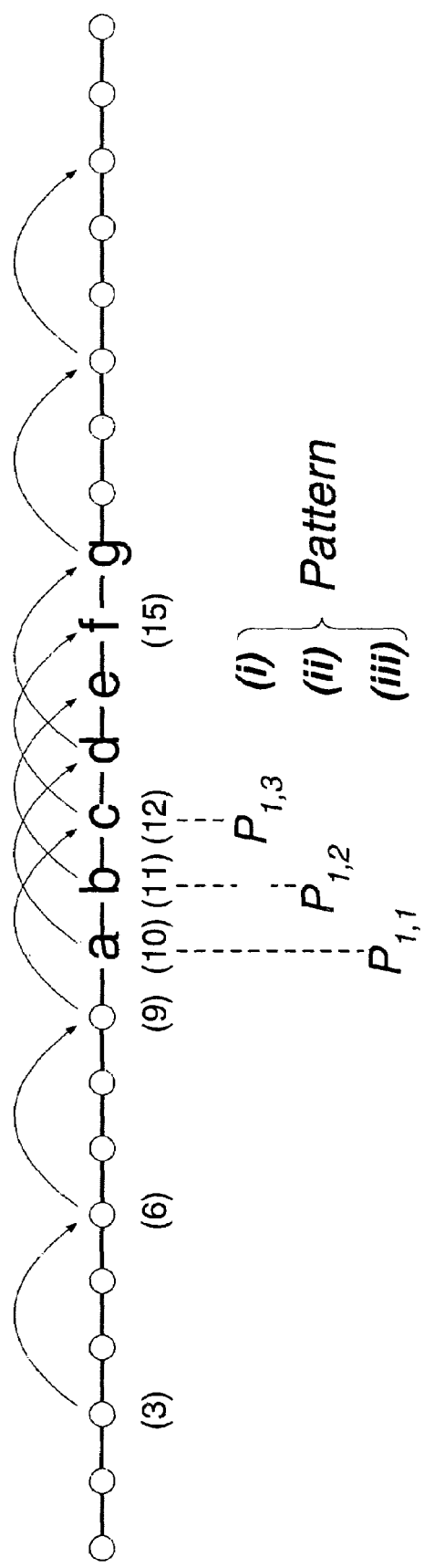
FIG. 5 illustrates a string matching process consistent with the present invention.
Figure 6C:
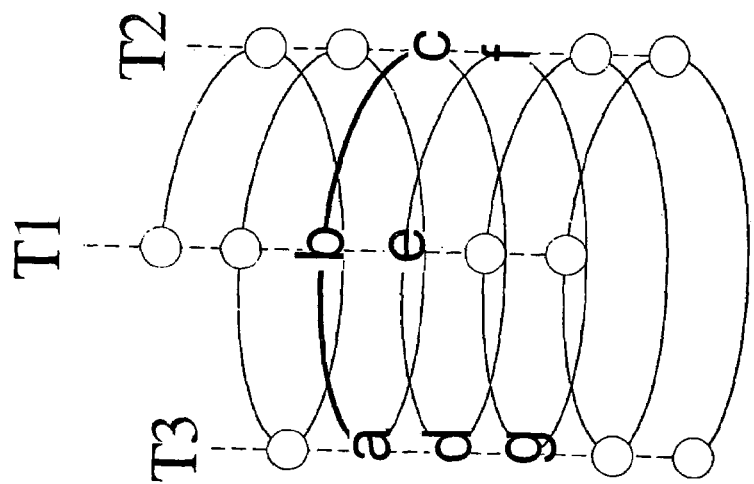
FIGS. 6(a)-6(c) illustrate a three-dimensional spiral model used for description of the spiral method consistent with the present invention.
Figure 6B:
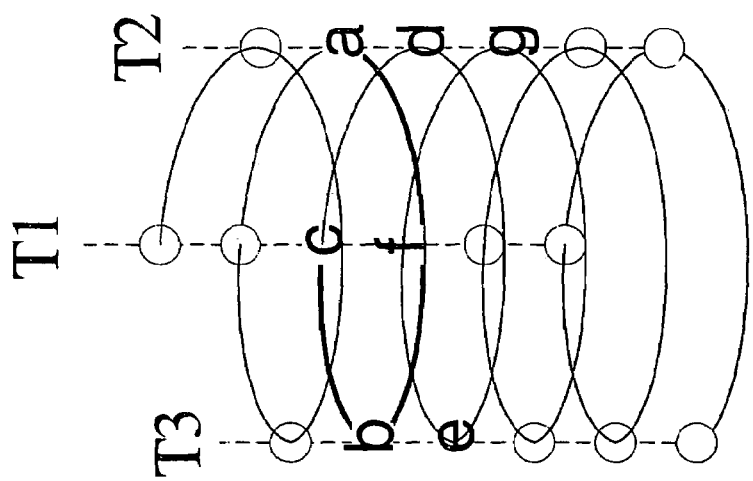
Figure 6A:
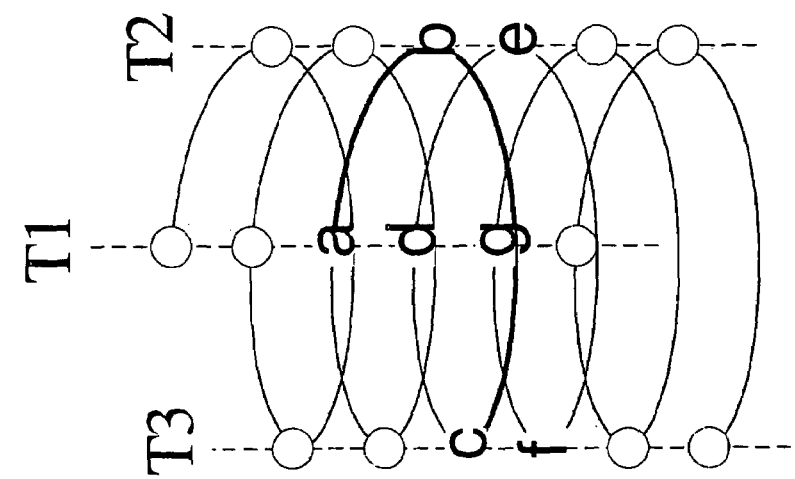

An explanation of the spiral method consistent with the present invention is provided next with reference to FIGS. 5 and 6(a)-6(c). In FIG. 5, the text is assumed to include a substring "abcdefg" and each additional character of the text is represented by a circle. The three text folds are: $T_1$, including a substring "adg"; $T_2$, including a substring "be"; and $T_3$, including a substring "cf". The patterns set includes a pattern $P_1$, "abcdefg". The three pattern folds of $P_1$ are: $P_{1,1}$, "adg"; $P_{1,2}$, "be"; and $P_{1,3}$, "cf".

The spiral method first selects a text fold and searches the selected text fold for any of the pattern folds. For example, text fold $T_3$ is first selected and a match of $P_{1,3}$ is found at the 12-th character of the text string T and includes the 12-th and 15-th characters, "cf". Then, text fold $T_2$ is searched, starting from the 11-th character of the text string T, and a match of $P_{1,2}$ is found, which includes the 11-th and the 14-th characters, "be". Finally, text fold $T_1$ is searched, starting from the 10-th character of the text string T, and a match of $P_{1,1}$ is found, which includes the 10-th, 13-th, and 16-th characters, "adg". As shown in FIG. 5, all three pattern folds of $P_1$ are found in the text and the matches thereof constitute pattern $P_1$. Thus, a match of $P_1$ is found.

Thus, the spiral method of the present invention searches the text for any pattern fold of a pattern and determines if a portion of the text is likely to contain a match of that pattern. For portions of the text that do not contain a match of any pattern fold of the pattern, the spiral method would skip such portions. If, otherwise, a match of a pattern fold is found in the text, then a more careful search will be performed in the neighborhood of the match of the pattern fold to determine if other pattern folds exist in the text. By skipping portions of the text string where no pattern fold is found in the selected text fold, the spiral string matching method consistent with the present invention can be much faster than conventional string matching methods.

To help visualize the above-described string matching process, the spiral method may be described using a three-dimensional model, in which characters of a received text are arranged along a spiral called a "text spiral". In the following description, the text spiral is positioned such that it runs circularly while descending from top to bottom. An exemplary text spiral formed from the text of FIG. 5 is shown in FIG. 6(*a*). If viewed from above, the text spiral in FIG. 6(*a*) and the text spirals in the following examples all run clockwise from top to bottom. However, the direction of a text spiral may be either clockwise or counterclockwise and is unimportant to the present invention. In a text spiral, characters of each text fold of the text are aligned along a vertical line. Therefore, for a folding width of w, the text spiral includes w vertical lines each representing a text fold and each turn of the text spiral contains w characters, wherein a "turn" may be defined as a portion of the text spiral running from one point (inclusive) on a vertical line to a point (exclusive) on the vertical line immediately below the one point. As shown in FIG. 6(*a*), the text spiral includes three vertical lines along which characters of text folds $T_1$, $T_2$, and $T_3$ are respectively aligned. In the 3-D model of the text spiral, a search of a text fold may be visualized as a search along a corresponding vertical line of the text spiral.

It is to be understood that, in the descriptions herein, terms such as "spiral", "tree", "vertical lines", "latitude", etc., are used only for illustrative purposes. One skilled in the art would understand that such a spiral or a tree or vertical lines do not exist in physical form in a processor implementing the spiral method of the present invention. The realization thereof in software should now be apparent to one skilled in the art.

For illustrative purposes, assuming a match of a pattern fold F of pattern P is found in a text fold $T_i$ of text T, a latitude of the match of F in text fold $T_i$ is defined as consisting of a full turn of the text spiral of text T, including the first character of the match of F in text fold $T_i$, with the position of the first character of the match of F in the full turn of the text spiral corresponding to a position of pattern fold F in pattern P. Thus, assuming that the folding width is six, and pattern fold F is the third in pattern P, then the latitude of the match of F in text fold $T_i$ includes the first character of the match of F in text fold $T_i$, two characters immediately therebefore in the text spiral, and three characters immediately thereafter in the text spiral. Since pattern fold F may appear in more than one pattern in the patterns set, the latitude of the match of F may vary depending on which pattern is currently being determined by the search process to exist in the text string. FIG. 6(*a*) may be referred to as another example, wherein pattern fold $P_{1,3}$ found in text fold $T_3$ is the third pattern fold of pattern $P_1$. The latitude of the match of pattern fold $P_{1,3}$ found in text fold $T_3$ then includes the first letter of the match of pattern fold $P_{1,3}$, i.e., "c", and two characters immediately therebefore in the text spiral, i.e., "a" in text fold $T_1$ and "b" in text fold $T_2$. These three characters constitute a full turn of the text spiral, with the position of character "c" therein corresponding to the position of pattern fold $P_{1,3}$ in pattern $P_1$. If more than one pattern fold is found in the text and the latitudes of matches of these pattern folds coincide with one another, the matches of the pattern folds are said to be at the same latitude.

Thus, for a pattern $P_1$="abcdefg", which includes three pattern folds, i.e., $P_{1,1}$, "adg"; $P_{1,2}$, "be"; and $P_{1,3}$, "cf", to be found in a text T, which is arranged into a text spiral including three text folds $T_1$, $T_2$, and $T_3$, one of three conditions must be met: 1) $T_1$ includes a match of $P_{1,1}$, $T_2$ includes a match of $P_{1,2}$, $T_3$ includes a match of $P_{1,3}$, and the matches of the pattern folds are at the same latitude in the text spiral, as shown in FIG. 6(*a*); 2) $T_2$ includes a match of $P_{1,1}$, $T_3$ includes a match of $P_{1,2}$, $T_1$ includes a match of $P_{1,3}$, and the matches of the pattern folds are at the same latitude in the text spiral, as shown in FIG. 6(*b*); or 3) $T_3$ includes a match of $P_{1,1}$, $T_1$ includes a match of $P_{1,2}$, $T_2$ includes a match of $P_{1,3}$, and the matches of the pattern folds are at the same latitude in the text spiral, as shown in FIG. 6(*c*).

It should be clear now to one skilled in the art that, if a text contains a match of a pattern, then each and every text fold of the text must contain a match of a pattern fold of the pattern. Accordingly, the spiral method of the present invention searches any one selected text fold for a match of any pattern fold of a pattern. i) If no match of a pattern fold is found in the selected text fold, the text does not contain a match of the pattern. ii) If a match of a pattern fold is found in the selected text fold, the spiral method then searches other text folds of the text in the neighborhood of the match of the pattern fold found in the selected text fold for matches of other pattern folds of the pattern and determines if the matches of all the pattern folds in all the text folds constitute the pattern.

Accordingly, two different searches are performed consistent with the spiral method of the present invention: "vertical" searches to find matches of pattern folds in the text folds and "latitudinal" searches to determine if the matches of the pattern folds constitute a pattern. In the three-dimensional model of a text spiral, vertical searches are performed along the vertical lines, while the latitudinal searches are performed in a latitudinal direction around the spiral. The vertical search and the latitudinal search, although interweaved in practice, may be considered as separate string matching processes on a character-basis and fold-basis, respectively, and different string matching algorithms may be applied to the vertical search and to the latitudinal search.

In practice, the spiral method consistent with the present invention may be implemented in a string matching system such as a computer and may include two stages: a data preparation stage and a string matching stage. During the data preparation stage, all the patterns in the patterns set are analyzed and the results of the analysis are stored in the system for later use in the string matching stage. In the string matching stage, the system receives a text and performs a string matching process on the text using the results of the analysis from the data preparation stage and according to predetermined string matching algorithms. Because the data preparation work is usually performed off-line, and because the frequency at which the data preparation process is performed is generally much lower than the frequency at which string matching processes are performed, the efficiency or speed of the string matching method consistent with the present invention therefore mainly depends on the speed of the string matching process during the string matching stage. The data preparation process, the analysis results thereof, and the algorithm for performing the string matching process during the string matching stage consistent with the present invention are now discussed using the spiral model, from which the name of the spiral method is derived.

The data preparation stage includes several steps:

1) determining folding width w;

2) with the folding width w determined in step 1), forming a pattern folds set for the patterns set, and expressing each pattern of the patterns set as a sequence of the pattern folds;

3) deciding a string matching algorithm for the vertical searches, and forming a folds tree, a states tree, and/or a transition table for the pattern folds set on a basis of characters; and 4) deciding a string matching algorithm for the latitudinal searches, and forming a patterns tree, a states tree, and/or a transition table for the patterns set on a basis of pattern folds.

Each of the above steps will be discussed in further detail now.

1) Determining the Folding Width w

Depending on the choice of the folding width w, the efficiency of the spiral method may vary. For example, if, on one hand, w=1, then the text spiral reduces to just one vertical line and each pattern only contains one pattern fold, and the efficiency of the spiral method is equal to that of the algorithm applied in the vertical search. If, on the other hand, w is equal to the length of any pattern in the patterns set, each pattern fold reduces to just one character, and the efficiency of the spiral method is equal to that of the algorithm applied in the latitudinal search. In between the two extremes, for a larger w, pattern folds are shorter, and there is a greater possibility that a match of a pattern fold will be found during the vertical search. Therefore, an efficiency of the spiral method is closer to that of the algorithm applied in the latitudinal search. For a smaller w, pattern folds are longer, and there is a lower possibility that a match of a pattern fold will be found during the vertical search. Therefore, an efficiency of the spiral method is closer to that of the algorithm applied in the vertical search.

The effect of folding width w on the efficiency of the spiral method will be further discussed later in this description. In one aspect, a suitable folding width w may be chosen to be any integer between 1 and the length of the shortest pattern in the patterns set. In the following description, folding width w is assumed to be 3.

2) Forming a Pattern Folds Set for the Patterns Set

Figures 7A, 7B, 7C, 7D:
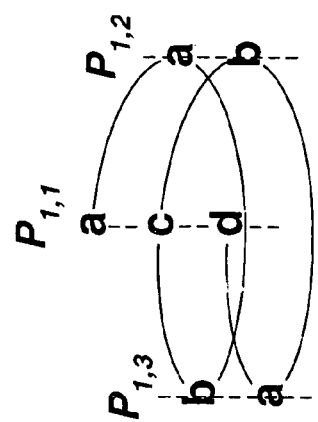
FIGS. 7(a)-7(d) illustrate the generation of pattern folds and a pattern folds set consistent with an embodiment of the present invention.

After the folding width w is determined, each pattern in the patterns set is also divided into w pattern folds. Similar to the formation of the text spiral described above, each pattern may also be conceptually formed into a pattern spiral for the formation of the pattern folds thereof, wherein the pattern spiral runs clockwise from top to down if viewed from above. Assuming that the patterns set includes three patterns: $P_1$="aabcbad", $P_2$="ababab", $P_3$="caadcbad", FIG. 7(a) illustrates the formation of pattern folds of pattern, $P_1$. The number of characters in each turn of the pattern spiral is fixed and is equal to the folding width w=3. As shown in FIG. 7(a), there are three vertical lines along each of which characters of $P_1$ are aligned with one other. All the characters along a vertical line form a pattern fold. Thus, pattern $P_1$ is divided into 3 pattern folds: "acd", "ab", and "ba". Pattern folds of other patterns may be formed in the same way. All the pattern folds of all the patterns in the patterns set are listed in FIG. 7(b), wherein $P_{i,j}$ denotes the j-th pattern fold of pattern $P_i$, i being an index of a pattern in the patterns set and j being an integer from 1 to w. Each pattern fold $P_{i,j}$ may also be mathematically expressed as a sequence of characters of pattern $P_i$: $P_{i,j}=\{P_i(j), P_i(j+w), \ldots, P_i(j+w\cdot\lfloor(n_i-j)/w\rfloor)\}$, wherein $P_i(x)$ is the x-th character of pattern $P_i$, $n_i$ is the length of pattern $P_i$, and $\lfloor x \rfloor$ is the greatest integer that is not greater than x. FIG. 7(c) lists the set of all distinct pattern folds as shown in FIG. 7(b), and labels each pattern fold in the set by a letter. As shown in FIG. 7(c), the pattern folds set includes four different pattern folds: A="ab", B="acd", C="ba", D="cda". After the pattern folds set is determined, each pattern is expressed as a string of pattern folds in the pattern folds set. FIG. 7(d) shows the expressions of the patterns as combinations of the pattern folds. In each expression, the order of the pattern folds is the same as the order in which the pattern folds appear in the corresponding pattern.

3) Deciding a String Matching Algorithm for the Vertical Searches

Then, a matching algorithm is decided for the vertical searches and, according to the vertical search algorithm, a folds tree and the corresponding states tree and transition table are formed for the pattern folds set of FIG. 7(c) on a basis of characters. The formation of the folds tree and its corresponding states tree and transition table may vary, depending on which algorithm is chosen for the vertical searches, and will be discussed further below.

4) Deciding a String Matching Algorithm for the Latitudinal Searches

Next, a string matching algorithm is decided for the latitudinal searches and, according to the latitudinal search algorithm, a patterns tree and the corresponding states tree and transition table are formed for the patterns in the patterns set of FIG. 7(d) on a basis of pattern folds. Consistent with an embodiment of the present invention, the AC_BM Algorithm is applied in the latitudinal search. Consistent with another embodiment, the AC Algorithm is applied in the latitudinal search.

Treating each pattern fold as a unit and each pattern as a string of letters denoting the pattern folds thereof, as shown in FIG. 7(d), a patterns tree may be generated, with a null root node and each other node labeled by a letter representing a pattern fold. Each pattern is mapped to a corresponding node of the patterns tree such that a string of all the nodes along the shortest path from the corresponding node to the root node constitutes that pattern. The patterns tree is generated by first aligning all the patterns as strings of letters denoting pattern folds and then merging the letters. Because the number of pattern folds of each pattern is a fixed number, i.e., the folding width, the number of levels in the patterns tree excluding a null root node is also equal to the folding width. Depending on which algorithm is chosen for the latitudinal searches, the formation of the patterns tree may vary, which will be discussed further below.

The folds tree, the patterns tree, and the states trees and transition tables thereof are then stored in the string matching system after being formed, as discussed above.

When the data preparation stage as discussed above is completed, the string matching system is ready to enter into the string matching stage, during which the system may receive texts and perform string matching processes.

When a text is received by the system, the text is divided into several text folds. As discussed above, the text may be conceptually formed into a text spiral for the formation of the text folds thereof, wherein the text spiral runs clockwise from top to down if viewed from above. The number of characters in each turn of the text spiral is fixed and is equal to the folding width w. All the characters along a vertical line form a text fold.

The string matching process consistent with the present invention comprises three procedures including procedure 0, procedure 1, and procedure 2, each of which is discussed in further detail below. The string matching process starts with procedure 0 and continues with procedure 1. Within procedure 1, there are provided interrupt points that lead to the execution of procedure 2, while procedure 2 provides for a point to return to procedure 1. The string matching process completes itself as procedure 1 exits. Therefore, procedures 1 and 2 may be interweaved during a string matching process.

In particular, program 0 selects, according to the latitudinal search algorithm, an initial text fold, from the first character of which a vertical search according to procedure 1 will be performed.

Procedure 1 performs a vertical search upon a selected text fold, starting from a starting point of the selected text fold, wherein the selected text fold and the starting point are chosen by a previous procedure. The vertical search is performed according to the vertical search algorithm. If a pattern fold is found in the selected text fold, procedure 1 is interrupted, the pattern fold found in the selected text fold is stored, and procedure 2 is executed. If, however, the vertical search reaches the bottom of the text spiral and no other pattern fold is found in the selected text fold, procedure 1 exits, and string matching process of this text is finished. In the vertical searches, the folds tree and the corresponding states tree and transition table are used.

Procedure 2 receives inputs from procedure 1 including information on pattern folds found in the text folds and performs a latitudinal search around the text spiral according to the latitudinal search algorithm to determine if a pattern exists in the text. If the pattern folds found in the text folds are at the same latitude and constitute a pattern, a match of that pattern is found. Procedure 2 further selects a text fold which is aligned to a pattern fold to be compared next according to the latitudinal search algorithm. Procedure 1 will then be executed to start a vertical search on the selected text fold starting from a character at the latitude of a match of a pattern fold found during the previous execution of procedure 1. In the latitudinal searches, the patterns tree and the corresponding states tree and transition table are used.

Embodiments of the present invention are now described. Consistent with a first embodiment, the AC Algorithm is applied in the vertical searches and the AC_BM Algorithm is applied in the latitudinal searches. Consistent with a second embodiment, the AC Algorithm is applied in both the vertical searches and the latitudinal searches.

Consistent with the first embodiment, the AC_BM Algorithm is applied in the latitudinal searches and the AC Algorithm is applied in the vertical search. The folds tree, the patterns tree, and the corresponding states trees and transition tables are formed accordingly. FIG. 8(*a*) shows a folds tree formed for the pattern folds set of FIG. 7(*c*) according to the AC Algorithm. The folds tree includes a number of nodes each labeled by a character. Each pattern fold corresponds to a node of the folds tree, and a string composed of all the nodes from a root node to a corresponding node spells out each pattern fold. FIG. 8(*b*) shows a states tree indicating state transition conditions for the folds tree of FIG. 8(*a*). FIG. 8(*c*) is a table listing the failure nodes of all the possible states as shown in FIG. 8(*b*). The formation of the folds tree and the formation of the states tree and the transition table thereof may be in the same manner as the formation of the patterns tree have been described above.

Figure 9:
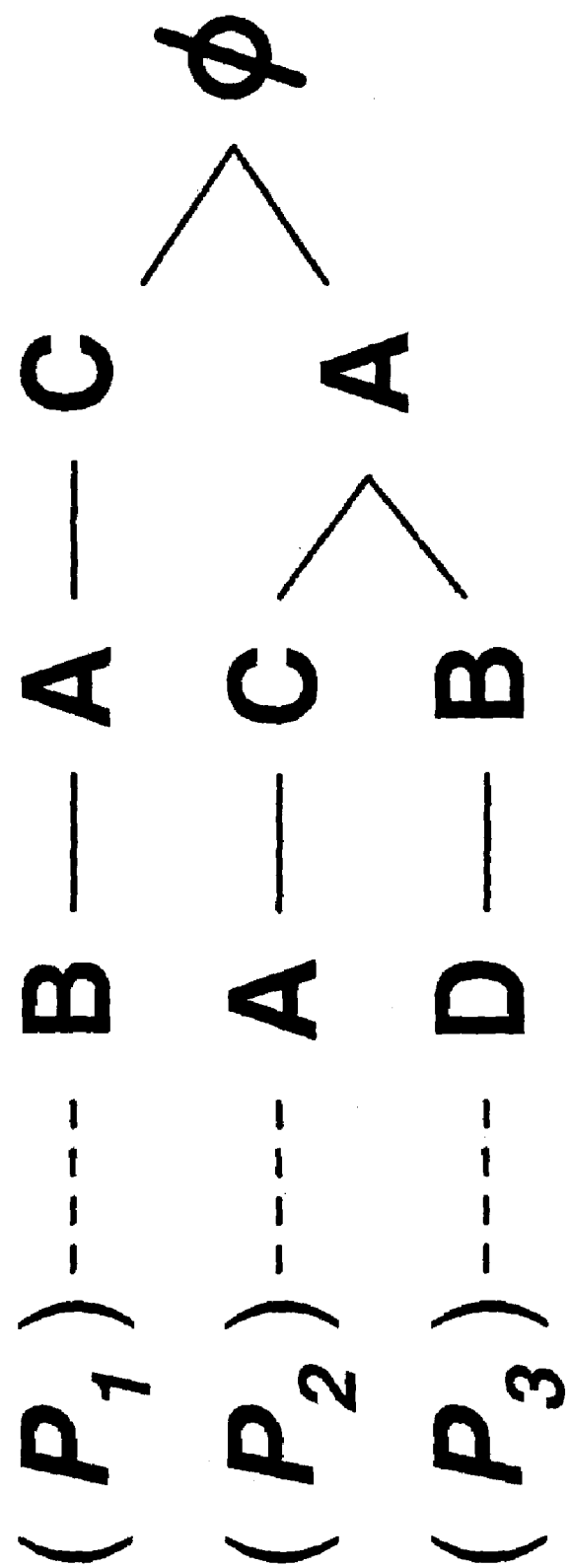
FIG. 9 illustrates the generation of a patterns tree consistent with a first embodiment of the present invention.
Figure 10D:
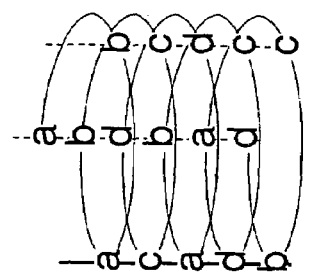
FIG. 10(a)-10(d) illustrate an example of a matching process consistent with a first embodiment of the present invention.
Figure 10C:
Figure 10B:
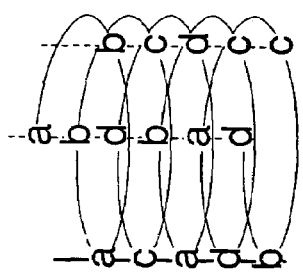
Figure 10A:
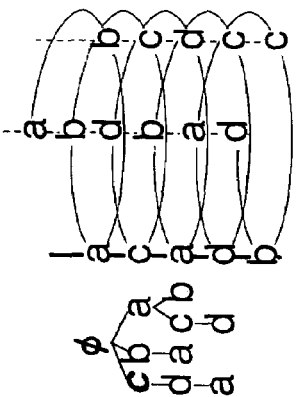
Figure 10A:
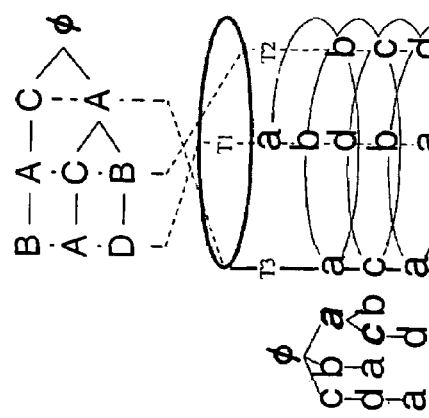

Because the vertical search moves from top to bottom along the vertical lines of the text spiral, a patterns tree created according to the AC_BM Algorithm, which is applied in the latitudinal searches, must also move from the beginning to the end of the text spiral to avoid an infinite loop. Thus, the letters denoting the pattern folds in the patterns tree are merged from right to left and the patterns tree has a root node at a right end thereof and expands to the left. Also, when a pattern including a number of pattern folds is mapped to a node of the patterns tree, a pattern fold that comes before a later pattern fold in the pattern is represented by a node at a deeper level than that of the node representing the later pattern fold. FIG. 9 shows a patterns tree thus formed, which has 3 levels excluding the null root node. The states tree and the transition table of the patterns tree may be formed in the same manner as the formation of those according to the AC_BM Algorithm and, therefore, are not described herein.

Figure 4A:
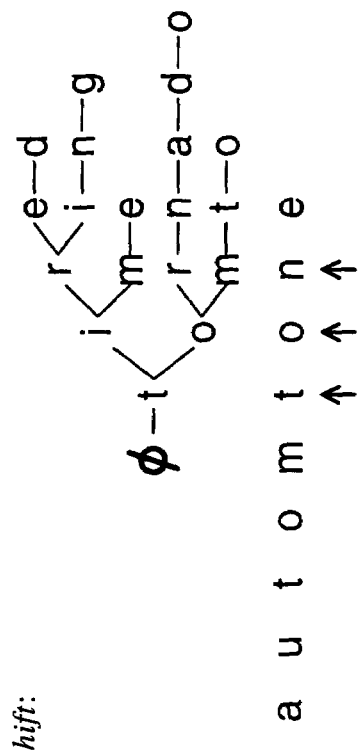
FIGS. 4(a)-4(b) illustrate the good prefix rule according to the AC_BM Algorithm.
Figure 4B:
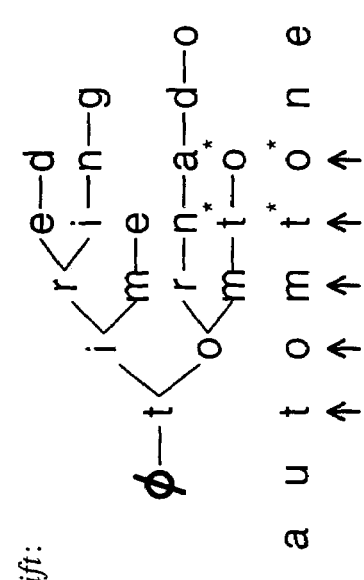

During the latitudinal search, the patterns tree is aligned with the text spiral such that each level of the patterns tree is aligned with a vertical line and a parent level of the patterns tree comes after a child level of the patterns tree in the clockwise direction. The root node, a null node, is not aligned with any vertical line of the text spiral. In an initial alignment of the patterns tree, the patterns in the patterns tree are aligned to the beginning of the text spiral, consistent with the AC_BM Algorithm. Also during the latitudinal search, the patterns tree moves forward along the text spiral, or rotates clockwise. At each alignment position of the patterns tree, vertical searches are performed according to the AC Algorithm to find matches of pattern folds, and the latitudinal search looks at matching pattern folds to determine if they constitute a pattern. Rules similar to the bad character rule and the good prefix rule may be applied. Because the nodes of the patterns tree represent pattern folds rather than characters and the patterns tree moves forward along the text spiral rather than backward (as shown in FIGS. 4(*a*) and 4(*b*)), the corresponding rules may be respectively called the bad fold rule and the good suffix rule.

Examples of the searching process consistent with the first embodiment are shown in FIGS. 10(*a*)-10(*d*) and 11(*a*)-11(*h*).

In FIGS. 10(*a*)-10(*d*), the text is assumed to be "ababc-cddabcdacbd", and the text spiral has three vertical lines representing three text folds: $T_1$="abdbad", $T_2$="bcdcc", and $T_3$="acadb". According to the AC_BM Algorithm, the patterns tree is initially aligned to the beginning of the text spiral, as shown in FIG. 10(*a*), and procedure 0 selects an initial text fold $T_3$="acadb", which is aligned to the first level of the patterns tree. A first vertical search according to procedure 1 is then performed on $T_3$ ="acadb". As shown in FIG. 10(*a*), the folds tree is first aligned to the top of text fold $T_3$, wherein no match of a pattern fold is found. In FIG. 10(*b*), the folds tree is shifted downward by one character and, again, no match is found. The vertical search process continues by shifting the folds tree downward until the shortest pattern fold in the folds tree is aligned with the end of the selected text fold, and procedure 1 exits, concluding the string matching process. As shown in FIG. 10(*d*), no match of any pattern fold is found in $T_3$, and it may be concluded that there is no match of any pattern in the text.

Figure 11D:
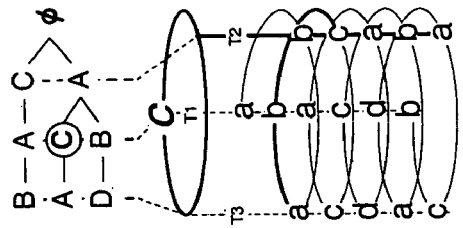
FIG. 11(a)-11(h) illustrate another example of the matching process consistent with a first embodiment of the present invention.
Figure 11H:
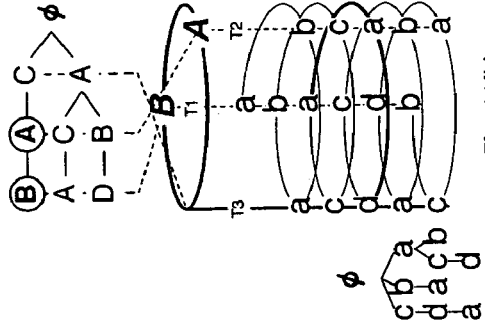
Figure 11C:
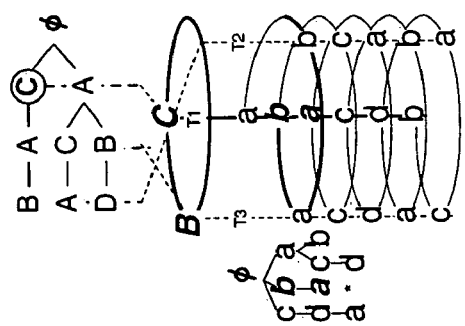
Figure 11G:
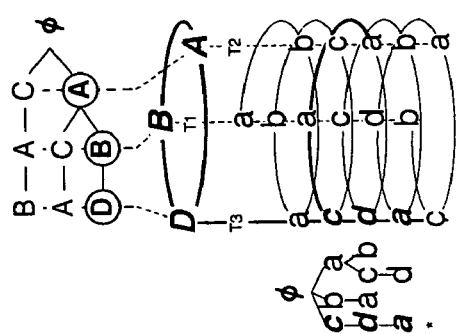
Figure 11B:
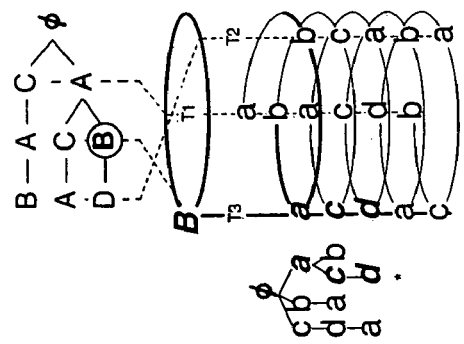
Figure 11F:
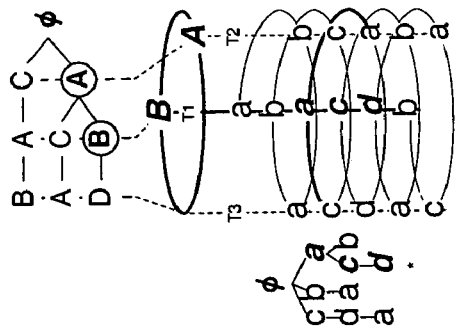
Figure 11A:
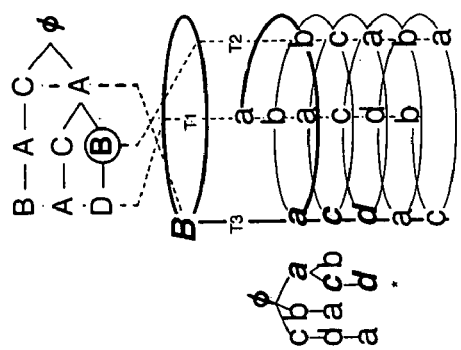
Figure 11E:
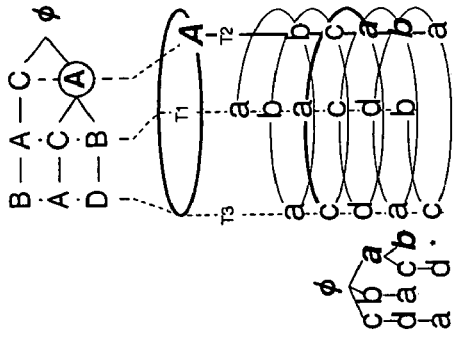

In FIGS. 11(a)-11(h), the text is assumed to be "ababccaadcbadacb" and contains three text folds: $T_1$="abacdb", $T_2$="bcaba", and $T_3$="acdac". According to the AC_BM Algorithm, the patterns tree is initially aligned to the beginning of the text spiral, as shown in FIG. 11(a), and procedure 0 selects an initial text fold $T_3$="acdac", which is aligned to the first level of the patterns tree. A vertical search according to procedure 1 is then performed on text fold $T_3$, where a match of pattern fold B="acd" is found. Information about the match of pattern fold B="acd", such as the position thereof in the corresponding text fold, is stored in the string matching system. Procedure 1 is interrupted and procedure 2 is executed. According to the AC_BM Algorithm, the patterns tree is aligned to the text spiral such that the first occurrence of B at the second level of the patterns tree is aligned with $T_3$, as shown in FIG. 11(b). Because pattern fold B currently being considered is at the second level of the patterns tree and therefore, if a match of a pattern is found containing that pattern fold B, that pattern fold B is at the second place of the matching pattern. Thus, the latitude of pattern fold B includes substring "bab" of the text, with the first character of pattern fold B, i.e., "a", positioned in the second place. Then, procedure 2 initiates another instance of procedure 1, which performs another vertical search on the vertical line aligned to the first level of the patterns tree, $T_1$, starting from the latitude of the matching pattern fold B, i.e., from the second character of $T_1$, as shown in FIG. 11(c). A match of pattern fold C is found in $T_1$ and procedure 1 reverts back to procedure 2. Because C followed by B is not part of a valid pattern in the patterns tree, i.e., a mismatch occurs at $T_3$, according to the AC_BM Algorithm, the patterns tree shifts clockwise such that the match of pattern fold C is aligned with level 2 of the patterns tree at which the next occurrence of C lies, as shown in FIG. 11(d). Procedure 2 then calls procedure 1, which performs a vertical search on $T_2$, which is aligned to the first level of the patterns tree, starting from the latitude of the match of pattern fold C in $T_1$. A match of pattern fold A is found, as shown in FIG. 11(e), and procedure 1 interrupts, the system again entering into procedure 2. Because the occurrence of A in $T_2$ is not at the same latitude as the match of C in $T_1$ and therefore cannot constitute a pattern together with the match of C previously found in $T_1$, a new vertical search according to procedure 1 is performed on $T_1$, and a match of pattern fold B is found at the same latitude as A in $T_2$, as shown in FIG. 11(f). The latitudinal search according to procedure 2 continues with a vertical search on $T_3$, finding a match of pattern fold D at the same latitude as A in $T_2$ and B in $T_1$, as shown in FIG. 11(g). The matching pattern folds, D, B, and A collectively form pattern $P_3$=D+B+A. Thus, a match of pattern $P_3$ is found. Procedure 2 continues to shift the patterns tree clockwise relative to the text spiral according to the AC_BM Algorithm, such that the next occurrence of B+A in the patterns tree is aligned to occurrence of B+A in the text spiral (good suffix rule), as shown in FIG. 11(h). Procedure 2 also determines that text fold $T_3$, which is aligned to the first level of the patterns tree, is to be searched next during the vertical search, starting from a point at the latitude of the matches of B+A. Procedure 1 then performs a vertical search on text fold $T_3$. The vertical search is continued until the shortest pattern fold in the pattern folds tree is aligned to the bottom of a vertical line and no additional pattern fold is found, as shown in FIG. 11(h). Procedure 1 then exits, concluding the string matching process.

As discussed above, when a pattern fold of a certain pattern is found in the selected text fold, the vertical search of the selected text fold is interrupted, the status thereof being stored. Thus, when a match of pattern fold B="acd" is found in $T_3$, as shown in FIG. 11(b), the status of the vertical search of $T_3$, i.e., state 8, is stored in the matching machine. When a match of pattern $P_3$ is found, the vertical search of $T_3$ is resumed from state 8 (see FIG. 8(b)). Because node 8 is a leaf node, the matching machine jumps directly to its failure node, i.e., state 7, and then jumps to state 9 upon the comparison of the next character, "a", where another match of pattern fold D="cda" is found in $T_3$, as shown in FIG. 11(g). Thus, the spiral method consistent with the present invention avoids repeatedly comparing the characters in a text fold and thus improves performance by storing the status of each selected text fold before interruption of its vertical search.

Consistent with a second embodiment of the present invention, the spiral method applies the AC Algorithm in both the vertical search and the latitudinal search. The second embodiment may be described with reference to FIGS. 12, 13(a)-13(c), and 14(a)-14(h). In the following descriptions of the second embodiment, the patterns set is assumed to be the same as in the above description of the first embodiment and the folding width is also assumed to be 3.

Because the vertical search consistent with the second embodiment also applies the AC Algorithm, the formation of the folds tree, the states tree, and the transition table is the same as that for the first embodiment as discussed above and is not described in details herein.

Figure 12:
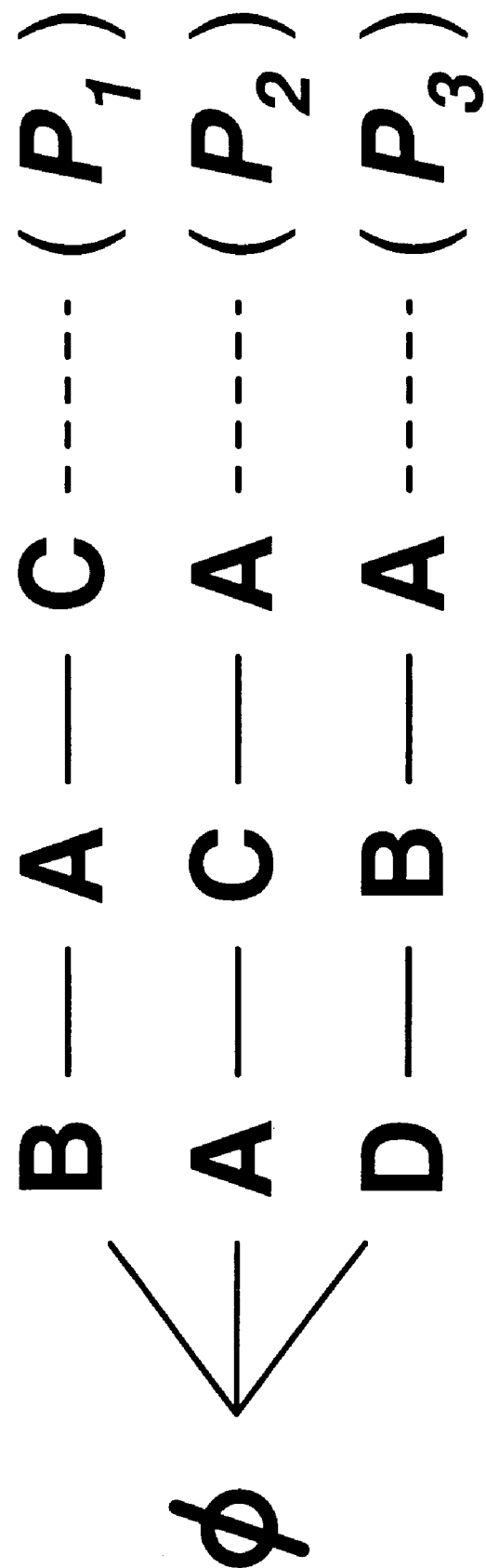
FIG. 12 illustrates the generation of a patterns tree consistent with a second embodiment of the present invention.

However, because the AC Algorithm is applied in the latitudinal search in the second embodiment, the patterns tree has a root node at a left end thereof and expands to the right, as shown in FIG. 12. Therefore, when the patterns tree is arranged with the text spiral, a parent level of the patterns tree comes before a child level of the patterns tree in the clockwise direction. The root node is not aligned with any vertical line of the text spiral. During the latitudinal search, the patterns tree moves forward along the text spiral, or rotates clockwise.

Two examples of the searching process consistent the second embodiment are shown in FIGS. 13(a)-13(c) and 14(a)-14(h).

Figure 13C:
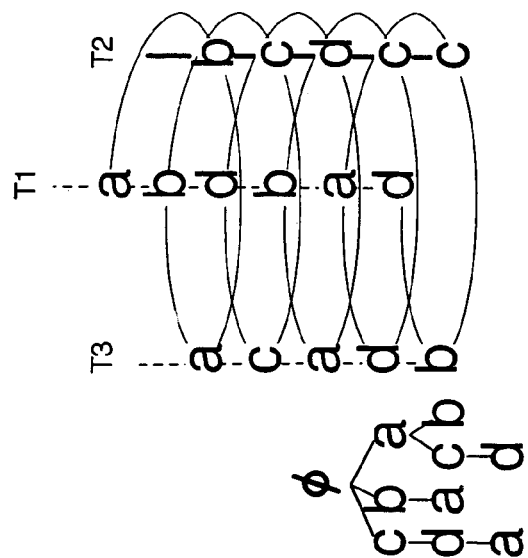
FIG. 13(a)-13(c) illustrate an example of a matching process consistent with a second embodiment of the present 40 invention.
Figure 13B:
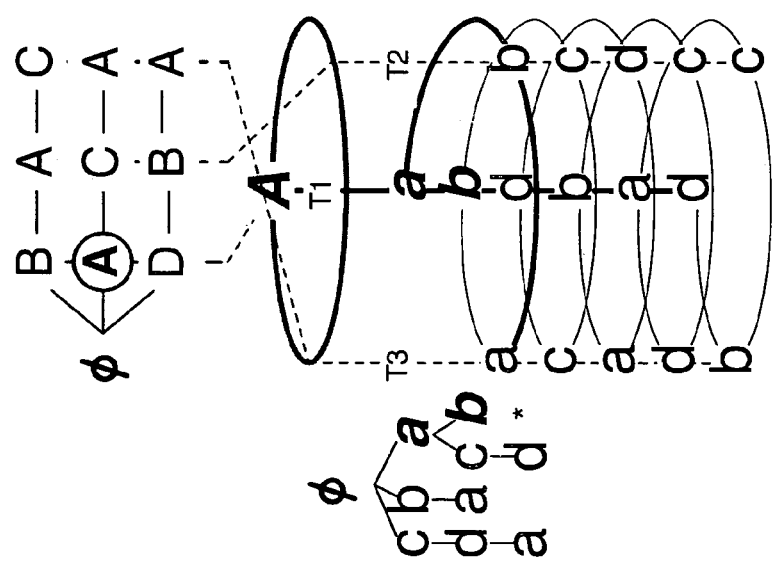
Figure 13A:
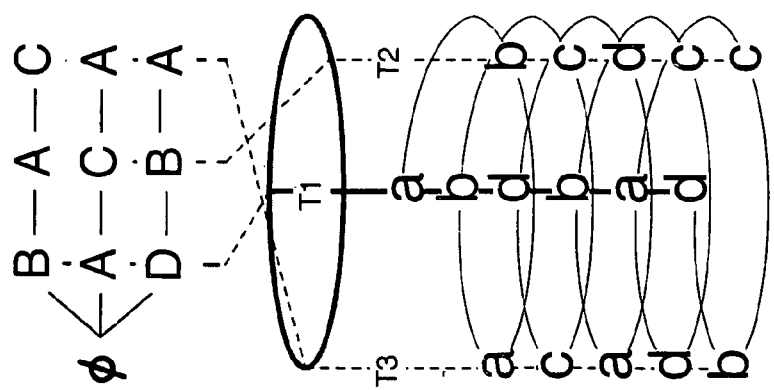

In FIGS. 13(a)-13(c), the text is assumed to be "ababccddabcdacbd". According to the AC Algorithm of the latitudinal search, the patterns tree is first aligned to the beginning of the text spiral, as shown in FIG. 13(a). A vertical search also applying the AC Algorithm is first performed on text fold $T_1$="abdbad", which is aligned to the first level of the patterns tree. As shown in FIG. 13(b), the folds tree is first aligned to the top of text fold $T_1$, wherein a match of pattern fold A is found. Then, according to the AC Algorithm of the latitudinal search, a vertical search is performed on text fold $T_2$, starting from the point of $T_2$ at the latitude of the matching pattern fold A in text fold $T_1$. As shown in FIG. 13(c), the folds tree is shifted downward and is aligned with the end of $T_2$, while no pattern fold is found in $T_2$. Therefore, no match of a pattern exists in the text.

Figure 14H:
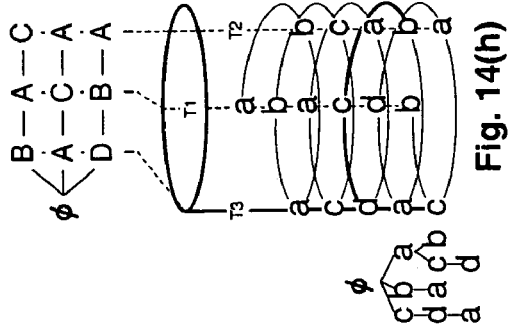
FIG. 14(a)-14(h) illustrate another example of the matching process consistent with a second embodiment of the present invention.
Figure 14D:
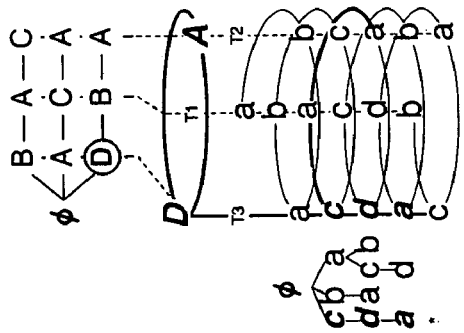
Figure 14G:
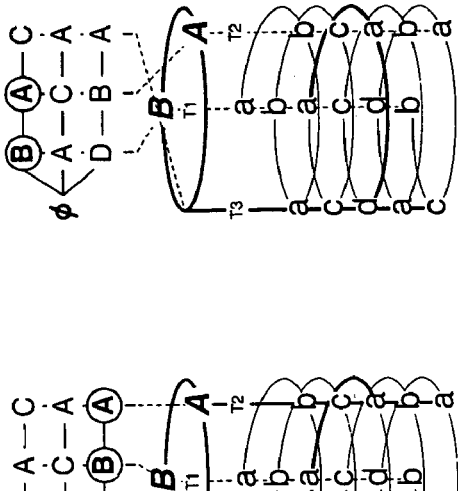
Figure 14C:
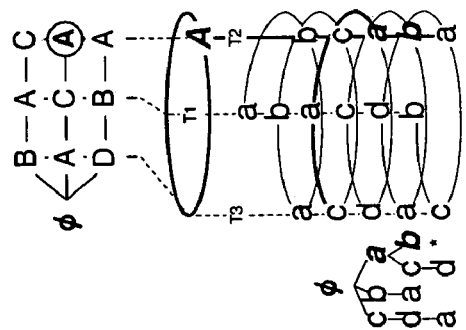
Figure 14F:
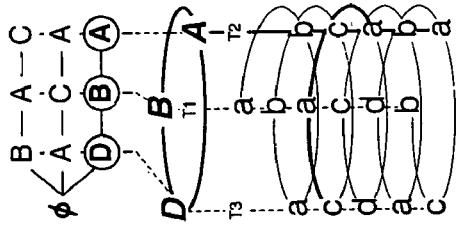
Figure 14B:
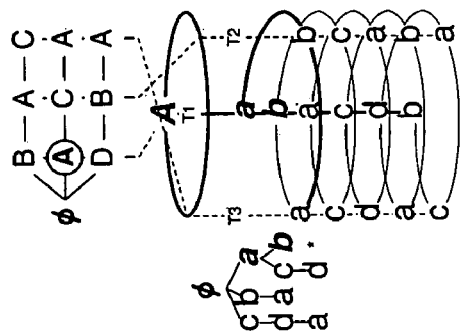
Figure 14E:
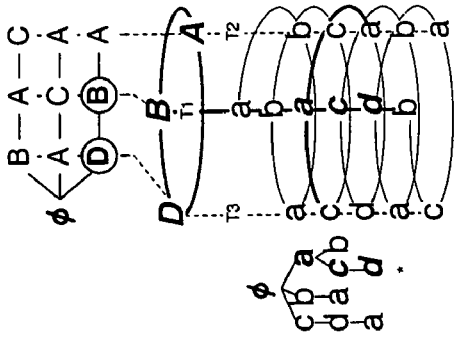
Figure 14A:
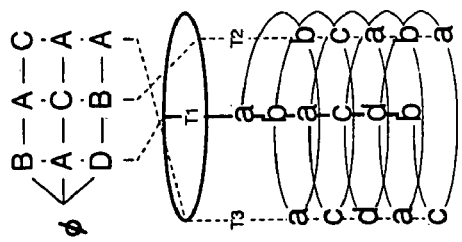

In FIGS. 14(a)-14(h), the text is assumed to be "ababccaadcbadacb" and contains three text folds: $T_1$="abacdb", $T_2$="bcaba", and $T_3$="acdac". According to the AC Algorithm of the latitudinal search, the patterns tree is aligned to the beginning of the text spiral, as shown in FIG. 14(a). A vertical search also applying the AC Algorithm is first performed on text fold $T_1$, which is aligned to the first level of the patterns tree. A match of pattern fold A="ab" is found in $T_1$, as shown in FIG. 14(b). Then, a vertical search is performed on $T_2$, which is aligned to the second level of the patterns tree, starting from the latitude of the matching pattern fold A, i.e., from the first character of $T_2$. As shown in FIG. 14(c), a match of pattern fold A is found in $T_2$. However, the occurrence of A in $T_2$ is not at the same latitude as A in $T_1$ and, therefore, they cannot constitute a pattern together. A mismatch is considered to occur at $T_2$, and the patterns tree rotates clockwise along the text spiral. In an aspect, to avoid skipping portions of the text spiral that may contain a match of a pattern, the patterns tree rotates by an amount such that the occurrence of A in $T_2$ is aligned with the occurrence of A at the deepest possible level of the patterns tree, as shown in FIG. 14(c). Then, a vertical search is performed on $T_3$, which is now aligned with the first level of the patterns tree, starting from the latitude of the occurrence of A in $T_2$, which yields a match of pattern fold D, as shown in FIG. 14(d). The latitudinal search continues with a vertical search on $T_1$, which yields a match of pattern fold B, as shown in FIG. 14(e). The matches of pattern folds D, B, and A in $T_3$, $T_1$, and $T_2$, respectively, collectively form pattern $P_3$=D+B+A, as shown in FIG. 14(f). Thus, a match of pattern $P_3$ is found.

According to the AC Algorithm of the latitudinal search, the patterns tree further shifts clockwise along the text spiral such that the longest possible suffix of match of pattern $P_3$ in the text spiral matches a string of a node of the patterns tree and is aligned with that node. Referring to FIG. 14(g), pattern fold B followed by A is found to be a string of the node A in the second level of the patterns tree and, therefore, the patterns tree rotates by such an amount that B+A in the match of pattern $P_3$ previously found in the text spiral is aligned with that node A. A vertical search is then performed on text fold $T_3$, starting from the latitude of the match of pattern fold B in text fold $T_1$ or the latitude of the match of pattern fold A in text fold $T_2$. The above process may be repeated until the shortest pattern fold in the pattern folds tree is aligned to the bottom of a vertical line and no additional pattern fold is found, as shown in FIG. 14(h).

In the above discussions of the examples of the second embodiment, procedures 0~2 were not referred to for each step of the process. One skilled in the art should now be able to identify which one of procedures 0~2 was being executed during each step of the process.

Figure 15:
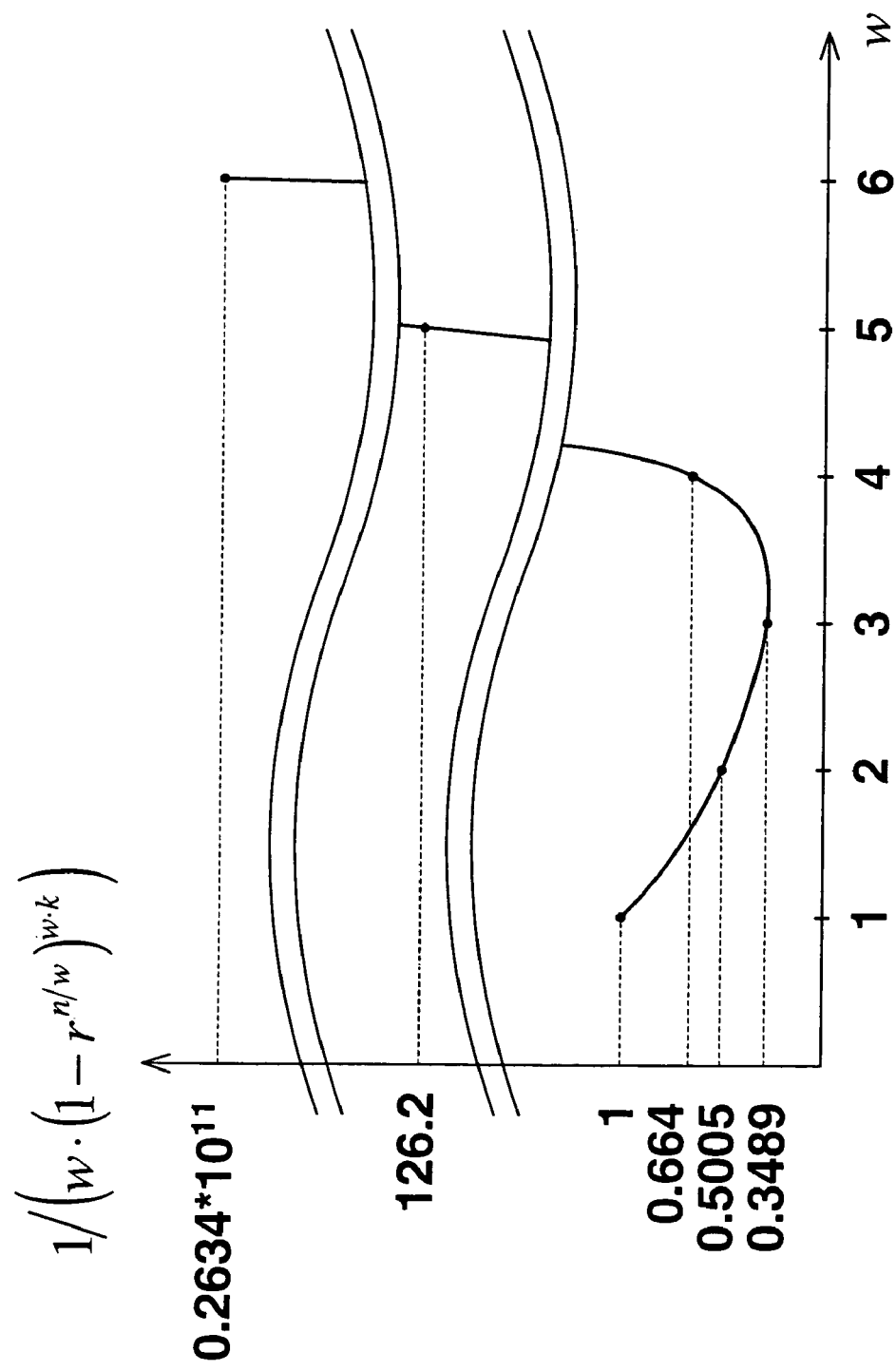
FIG. 15 graphically illustrates an effect of the folding width on the cost of the spiral method consistent with the present invention.

Finally, to illustrate the effect of w on the efficiency of the spiral method, a simplified calculation may be carried out. It is assumed that each character appears in the text with an identical probability r. Thus, for any character composed of 8 bits, its occurrence probability is $r=2^{-8}$. It is also assumed that the patterns set includes k patterns and each pattern contains n characters, wherein k and n are integers. Thus, each pattern fold contains n/w characters and the total number of pattern folds is about kw. During a vertical search along a vertical line of the text spiral, the probability of no pattern fold in the pattern folds set being found, i.e., the probability of successfully moving forward by one character along the vertical line, or the jumping probability, is $(1-r^{n/w})^{wk}$. Because each turn of the text spiral contains w characters, the string matching process is expected to move forward along the text by $w(1-r^{n/w})^{wk}$ characters after each search of one character along a vertical line, wherein $w(1-r^{n/w})^{wk}$ may be referred to as the expected jumping distance. Clearly, the larger the expected jumping distance, the faster the string matching process. A cost may then be defined as the inverse of $w(1-r^{n/w})^{wk}$, or $1/(w(1-r^{n/w})^{wk})$. When the folding width w is larger, the number of pattern folds, i.e., kw, is larger, and the length of each pattern fold, i.e., n/w, is shorter. Therefore, as w increases, the jumping probability, i.e., $(1-r^{n/w})^{wk}$, decreases rapidly. Also, when the number of patterns in the patterns set, k, increases, the number of pattern folds, kw, increases, and the jumping probability decreases accordingly. Table 1 gives some numerical values of $w(1-r^{n/w})^{wk}$ and $1/(w(1-r^{n/w})^{wk})$, assuming k=1000 and n=6. As shown in Table 1, when w is small (such as 1, 2, . . . ), the jumping probability is close to 1, and the expected jumping distance is mainly dependent on the value of w and increases proportionally with w. In contrast, when w is large (such as 6, 5, . . . ), the jumping probability decreases rapidly, and the expected jumping distance decreases with w. Therefore, a peak value of the expected jumping distance occurs at a middle point between the largest and the smallest possible values of folding width w. FIG. 15 graphically illustrates the calculation results of $1/(w(1-r^{n/w})^{wk})$ as shown in Table 1. As shown in FIG. 15, based on the above assumptions, the cost of the spiral method reaches a minimum and the efficiency reaches a maximum when w=3.

It will be apparent to those skilled in the art that various modifications and variations can be made in the disclosed methods without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

TABLE 1

| w | $(1 - r^{n/w})^{wk}$ | $w(1 - r^{n/w})^{wk}$ | $1/(w(1 - r^{n/w})^{wk})$ |
|---|---|---|---|
| 1 | 1 | 1 | 1 |
| 2 | 0.9999 | 1.9998 | 0.5005 |
| 3 | 0.955 | 2.866 | 0.3489 |
| 4 | 0.376 | 1.506 | 0.6640 |
| 5 | $1.585*10^{-3}$ | $7.926*10^{-3}$ | $1.263*10^{2}$ |
| 6 | $6.328*10^{-12}$ | $3.797*10^{-11}$ | $2.634*10^{10}$ |

What is claimed is:

1. A string matching method for use in a string matching system, wherein the string matching system receives a text and searches the text for any of a predetermined set of patterns, each of the text and the patterns including a string of characters or symbols, the method comprising:

generating a number of pattern folds for each of the patterns, the number of pattern folds for each of the patterns being equal to a folding width, wherein generating the pattern folds for each pattern comprises conceptually arranging a corresponding pattern into a pattern spiral running clockwise downward from top when viewed from above, a number of characters or symbols in each turn of the pattern spiral being equal to the folding width, wherein characters or symbols of the corresponding pattern are aligned along a number of vertical lines, the number of vertical lines being equal to the folding width, and wherein all of the characters or symbols along each of said vertical line constitute a pattern fold;

generating a set of pattern folds from the pattern folds of all the patterns;

generating a number of text folds for the text, the number of text folds being also equal to the folding width;

selecting one of the text folds;

performing a first search on the selected text fold for matches of any pattern folds in the set of pattern folds; and if a pattern fold is found in the selected text fold, performing a second search to determine if the text contains a match of any of the predetermined set of patterns.

2. The method of claim 1, wherein the folding width is an integer number ranging from greater than 1 to a length of a shortest pattern in the set of patterns.

3. The method of claim 1, wherein the folding width is an optimum value calculated based on cost.

4. The method of claim 1, wherein the set of pattern folds is generated to include all distinct pattern folds of all the patterns in the patterns set.

5. The method of claim 1, wherein generating the text folds for the text comprises conceptually arranging the text into a text spiral running clockwise downward from top when viewed from above, a number of characters or symbols in each turn of the text spiral being equal to the folding width, wherein characters or symbols of the text are aligned along a number of vertical lines, the number of vertical lines being equal to the folding width, and wherein all of the characters or symbols along each vertical line constitute a text fold.

6. The method of claim 5, wherein performing the first search comprises performing a vertical search along one of the vertical lines of the text spiral corresponding to the selected text fold.

7. The method of claim 6, wherein performing the vertical search along the one of the vertical lines comprises performing a search of the one of the vertical lines according to an AC Algorithm.

8. The method of claim 1, wherein performing the second search comprises
searching other text folds for pattern folds; and
determining if the matches of the pattern folds in all of the text folds constitute any of the predetermined set of patterns.

9. The method of claim 8, wherein performing the second search comprises searching the other text folds for matches of the pattern folds according to an AC Algorithm and selecting one of the text folds comprises selecting the one of the text folds according to the AC Algorithm.

10. The method of claim 8, wherein performing the second search comprises searching the other text folds for matches of the pattern folds according to an AC_BM Algorithm and selecting one of the text folds comprises selecting the one of the text folds according to the AC_BM Algorithm.

11. A string matching method for use in a string matching system, wherein the string matching system receives a text and searches the text for any of a predetermined set of patterns, each of the text and the patterns including a string of characters or symbols, the method comprising:
generating a number of pattern folds for each of the patterns, the number of pattern folds for each of the patterns being equal to a folding width, wherein the folding width is an integer number ranging from greater than 1 to a length of a shortest pattern in the set of patterns;
generating a set of pattern folds including all distinct pattern folds;
conceptually arranging the text into a spiral running clockwise downward from top when viewed from above, wherein a number of characters or symbols in each turn of the spiral is equal to the folding width, the characters or symbols of the text are aligned along a number of vertical lines, and all of the characters or symbols along each vertical line constitute a text fold;
performing a vertical search along a selected one of the vertical lines of the text spiral for matches of pattern folds; and
performing a latitudinal search in a latitudinal direction along the text spiral.

12. The method of claim 11, wherein the folding width is an optimum value calculated based on cost.

13. The method of claim 11, wherein each pattern fold consists of all the characters or symbols of the corresponding pattern that are equally spaced apart from one another by a distance equal to the folding width.

14. The method of claim 11, further comprising creating a folds tree to represent all of the set of pattern folds, wherein the folds tree has a root node and a number of descendant nodes, the root node being labeled by a character or labeled as null, each descendant node being labeled by a character, wherein each pattern fold in the set of pattern folds is mapped to a corresponding node of the folds tree, a string composed of all nodes along a shortest path from the root node to the corresponding node spelling out the mapped pattern fold.

15. The method of claim 14, wherein performing a vertical search along a selected vertical line comprises:
aligning the folds tree to the top of the selected vertical line;
determining whether a portion of the selected vertical line currently aligned with the folds tree matches any of the pattern folds in the folds tree;
if a mismatch occurs, shifting the folds tree downward along the selected vertical line according to a vertical search algorithm; and
repeating the step of determining whether a portion of the selected vertical line currently aligned with the folds tree matches any of the pattern folds in the folds tree.

16. The method of claim 15, wherein the folds tree is shifted downward according to an AC Algorithm.

17. The method of claim 15, wherein the vertical searches and the latitudinal searches terminate when the folds tree is aligned with the bottom of the selected vertical line.

18. The method of claim 11, further comprising creating a patterns tree, wherein the patterns tree includes a root node and a number of descendant nodes, the root node being labeled by one of the pattern folds or labeled as null, each descendant node being labeled by one of the pattern folds, wherein each pattern in the set of patterns is mapped to a corresponding node of the patterns tree, a string composed of all nodes along a shortest path between the root node to the corresponding node spelling out the mapped pattern.

19. The method of claim 18, wherein performing the latitudinal search further comprises:
arranging the patterns tree in a direction of the text spiral;
aligning the patterns tree to the beginning of the text spiral such that each level of the patterns tree is aligned to one of the vertical lines of the text spiral;
performing vertical searches each along a one of the vertical lines;
determining whether the matches of the pattern folds found during the vertical searches match a pattern;
if a mismatch occurs, shifting the patterns tree in a direction of and along the text spiral according to a latitudinal search algorithm; and
repeating the above step of determining whether the matches of the pattern folds match a pattern.

20. The method of claim 19, wherein the patterns tree is shifted according to an AC_BM Algorithm, and wherein the patterns tree has a root node at a right end thereof and expands to the left.

21. The method of claim 19, wherein the patterns tree is shifted according to an AC Algorithm, and wherein the patterns tree has a root node at a left end thereof and expands to the right.

22. The method of claim 19, wherein each of the vertical searches is performed along the one of the vertical lines starting from a latitude of a match of a pattern fold to which an occurrence of that pattern fold in the patterns tree is currently aligned, wherein a latitude of a pattern fold is defined as a turn of the text spiral including a first character of the match of the pattern fold, wherein the position of a first character of the match of the pattern fold in the turn corresponds to a position of the pattern fold in the patterns tree.

23. A string matching method for use in a string matching system, wherein the string matching system receives a text and searches the text for any of a predetermined set of patterns, each of the text and the patterns including a string of characters or symbols, the method comprising:
  determining a folding width w, wherein w is a positive integer;
  generating w text folds for the text, each text fold including all characters or symbols of the text spaced equally apart from one another by w characters or symbols;
  generating w pattern folds for each of the patterns, each pattern fold including all characters or symbols of the respective pattern spaced equally apart from one another by w characters or symbols,
    wherein generating the pattern folds for each pattern comprises conceptually arranging the corresponding pattern into a pattern spiral running clockwise downward from top when viewed from above, a number of characters or symbols in each turn of the pattern spiral being equal to the folding width, wherein characters or symbols of the corresponding pattern are aligned along a number of vertical lines, the number of vertical lines being equal to the folding width, and wherein all of the characters or symbols along each of said vertical line constitute a pattern fold;
  selecting a first string matching algorithm and a second string matching algorithm;
  performing data preparation according to the first and second string matching algorithms;
  selecting a text fold according to the second string matching algorithm; and
  searching the text for matches of any pattern in the patterns set by
    performing a first search according to the first string matching algorithm along the selected text fold for matches of any pattern folds in the set of pattern folds,
    if a pattern fold is found in the selected text fold, interrupting the first search and performing a second search according to the second string matching algorithm to determine if the text contains a match of any of the predetermined set of patterns,
    selecting a text fold which is aligned to a pattern fold to be compared next according to the second string matching algorithm, and
    resuming the first search and repeating the above steps until the first search reaches the end of the selected text fold.

24. The method of claim 23, wherein determining a folding width w comprises calculating a cost of the searches of the text, and the folding width is an optimum value based on the calculation of the cost.

25. The method of claim 23, wherein generating the text folds for the text comprises conceptually arranging the text into a text spiral running clockwise downward from top when viewed from above, a number of characters or symbols in each turn of the text spiral being equal to the folding width, wherein characters or symbols of the text are aligned along a number of vertical lines, the number of vertical lines being equal to the folding width, and wherein all of the characters or symbols along each vertical line constitute a text fold.

26. The method of claim 23, wherein selecting the first string matching algorithm comprises selecting an AC Algorithm.

27. The method of claim 26, wherein performing data preparation comprises generating a folds tree, a states tree, and a transition table according to the AC Algorithm applied in the first search.

28. The method of claim 27, further comprising generating the set of pattern folds including all distinct pattern folds of all the patterns in the patterns set, and the folds tree is generated to represent all the pattern folds in the set of pattern fold.

29. The method of claim 27, wherein performing the first search along the selected text fold comprises:
  aligning the folds tree to the beginning of the selected text fold such that each level of the folds tree is aligned with a character of the selected text fold;
  determining whether a portion of the selected text fold currently aligned with the folds tree matches any of the pattern folds in the folds tree;
  if a mismatch occurs, shifting the folds tree towards the end of the selected text fold according to the first string matching algorithm; and
  repeating the step of determining whether a portion of the selected text fold currently aligned with the folds tree matches any of the pattern folds in the folds tree.

30. The method of claim 29, wherein searching the text for matches of any pattern in the patterns set terminates when the folds tree is aligned with the end of the selected text fold.

31. The method of claim 23, wherein selecting a second string matching algorithm comprises selecting an AC_BM Algorithm.

32. The method of claim 31, wherein performing data preparation comprises generating a patterns tree, a states tree, and a transition table according to the second string matching algorithm applied in the second search.

33. The method of claim 32, wherein generating the patterns tree comprises generating the patterns tree to represent all the patterns in the patterns set, wherein the patterns tree includes a null root node and a plurality of descendent nodes, each descendent node labeled by a letter representing a pattern fold.

34. The method of claim 32, wherein the text is conceptually arranged into a text spiral running clockwise downward from top when viewed from above, a number of characters or symbols in each turn of the text spiral being equal to the folding width, wherein characters or symbols of the text are aligned along a number of vertical lines, the number of vertical lines being equal to the folding width, wherein all of the characters or symbols along each vertical line constitute one of the text folds, and wherein performing the second search comprises:
  arranging the patterns tree in a direction of the text spiral;
  aligning the patterns tree to the beginning of the text spiral such that each level of the patterns tree is aligned to one of the vertical lines of the text spiral;

performing vertical searches according to the first string matching algorithm each along a one of the vertical lines;

determining whether the matches of the pattern folds found during the vertical searches constitute one of the patterns;

if a mismatch occurs, shifting the patterns tree in a direction of and along the text spiral according to second string matching algorithm; and repeating the step of determining whether the matches of the pattern folds constitute a pattern.

35. The method of claim 34, wherein the second string matching algorithm is an AC_BM Algorithm, the patterns tree is shifted according to the AC_BM Algorithm, and wherein the patterns tree has a root node at a right end thereof and expands to the left.

36. The method of claim 34, wherein the second string matching algorithm is an AC Algorithm, the patterns tree is shifted according to the AC Algorithm, and wherein the patterns tree has a root node at a left end thereof and expands to the right.

37. The method of claim 34, wherein the vertical searches along the vertical lines are performed starting from a latitude of a match of one of the pattern folds to which an occurrence of the one of the pattern folds in the patterns tree is currently aligned, wherein a latitude of one of the pattern folds is defined as a turn of the text spiral including a first character of the match of the one of the pattern folds, wherein the position of a first character of the match of the one of the pattern folds in the turn corresponds to a position of the one of the pattern folds in the patterns tree.

* * * * *